(12) United States Patent
Behmann et al.

(10) Patent No.: US 7,615,157 B2
(45) Date of Patent: *Nov. 10, 2009

(54) APPARATUS FOR WITHDRAWING PERMEATE USING AN IMMERSED VERTICAL SKEIN OF HOLLOW FIBRE MEMBRANES

(75) Inventors: Henry Behmann, Puslinch (CA); Mailvaganam Mahendran, Mississauga (CA); Wayne Jerald Henshaw, Burlington (CA)

(73) Assignee: Zenon Technology Partnership DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/059,403

(22) Filed: Feb. 17, 2005

(65) Prior Publication Data
US 2005/0178728 A1    Aug. 18, 2005

Related U.S. Application Data

(60) Continuation of application No. 10/661,519, filed on Sep. 15, 2003, now abandoned, which is a continuation of application No. 09/849,573, filed on May 4, 2001, now Pat. No. 6,620,319, which is a continuation of application No. 09/507,438, filed on Feb. 19, 2000, now Pat. No. 6,294,039, which is a division of application No. 09/258,999, filed on Feb. 26, 1999, now Pat. No. 6,042,677, which is a division of application No. 08/896,517, filed on Jun. 16, 1997, now Pat. No. 5,910,250, and a continuation-in-part of application No. 08/690,045, filed on Jul. 31, 1996, now Pat. No. 5,783,083, which is a continuation-in-part of application No. 08/514,119, filed on Aug. 11, 1995, now Pat. No. 5,639,373.

(60) Provisional application No. 60/012,921, filed on Mar. 5, 1996.

(51) Int. Cl.
*B01D 61/00* (2006.01)
*B01D 63/00* (2006.01)
*B01D 65/02* (2006.01)

(52) U.S. Cl. ................... 210/636; 210/650
(58) Field of Classification Search ........... 210/636, 210/650, 321.69, 321.8, 257.2, 232, 238, 210/321.6
See application file for complete search history.

(56) References Cited

U.S. PATENT DOCUMENTS 3,704,223 A    11/1972    Dietzsch et al.

(Continued)

FOREIGN PATENT DOCUMENTS

DE    19502516    1/1997

(Continued)

OTHER PUBLICATIONS

English language abstract of JP62-144712.

(Continued)

*Primary Examiner*—Ana M Fortuna
(74) *Attorney, Agent, or Firm*—Bereskin & Parr

(57) ABSTRACT

A process is described for withdrawing filtered permeate from a non-pressurized substrate in a reservoir through an assembly. The assembly has a plurality of hollow fiber filtering membranes disposed generally vertically between two solid bodies, an enclosure sealed to the upper solid body to define a cavity, a permeate port in communication with the cavity and the lumen of each membrane in fluid communication with the port via the cavity. A suction is applied to lumens of the membranes via the permeate port to withdraw permeate. A gas is directed to provide bubbles which contact the membranes. Feed water is added so that the membranes are immersed while applying the suction.

11 Claims, 13 Drawing Sheets

SLUDGE REMOVAL

U.S. PATENT DOCUMENTS

| Patent No. | | Date | Inventor |
|---|---|---|---|
| 3,708,071 | A | 1/1973 | Crowley |
| 3,730,959 | A | 5/1973 | Horres |
| 3,794,169 | A | 2/1974 | Sisk et al. |
| 3,853,756 | A | 12/1974 | Stana |
| 3,992,301 | A | 11/1976 | Shippey et al. |
| 4,075,100 | A | 2/1978 | Furuta et al. |
| 4,414,113 | A | 11/1983 | LaTerra |
| 4,540,490 | A | 9/1985 | Shibata et al. |
| 4,605,500 | A | 8/1986 | Takemura et al. |
| 4,647,377 | A | 3/1987 | Miura |
| 4,668,401 | A | 5/1987 | Okumura et al. |
| 4,707,268 | A | 11/1987 | Shah et al. |
| 4,756,875 | A | 7/1988 | Tajima et al. |
| 4,775,471 | A | 10/1988 | Nagai et al. |
| 4,876,006 | A | 10/1989 | Ohkubo et al. |
| 4,886,601 | A | 12/1989 | Iwatsuka et al. |
| 4,915,833 | A | 4/1990 | Iwatsuka et al. |
| 5,035,799 | A | 7/1991 | Rosberg et al. |
| 5,104,535 | A | 4/1992 | Cote et al. |
| 5,141,031 | A | 8/1992 | Baurmeister |
| 5,151,191 | A | 9/1992 | Sunaoka et al. |
| 5,182,019 | A | 1/1993 | Cote et al. |
| 5,192,456 | A | 3/1993 | Ishida et al. |
| 5,202,023 | A | 4/1993 | Trimmer et al. |
| 5,209,852 | A | 5/1993 | Sunsoka et al. |
| 5,248,424 | A | 9/1993 | Cote et al. |
| 5,366,625 | A | 11/1994 | Pedersen et al. |
| 5,403,479 | A | 4/1995 | Smith et al. |
| 5,451,317 | A | 9/1995 | Ishida et al. |
| 5,480,553 | A * | 1/1996 | Yamamori et al. .......... 210/650 |
| 5,484,528 | A | 1/1996 | Yagi et al. |
| 5,584,997 | A | 12/1996 | Yagihashi et al. |
| 5,607,593 | A | 3/1997 | Cote et al. |
| 5,639,373 | A | 6/1997 | Mahendran et al. |
| 5,643,455 | A | 7/1997 | Kopp et al. |
| 5,647,988 | A | 7/1997 | Kawanishi et al. |
| 5,783,083 | A | 7/1998 | Henshaw et al. |
| 5,910,250 | A | 6/1999 | Mahendran et al. |
| 5,932,099 | A | 8/1999 | Cote et al. |
| 5,944,997 | A * | 8/1999 | Pedersen et al. ............ 210/636 |
| 6,042,677 | A | 3/2000 | Mahendran et al. |
| 6,045,698 | A | 4/2000 | Cote et al. |
| 6,156,200 | A * | 12/2000 | Zha et al. ............... 210/321.89 |
| 6,193,890 | B1 | 2/2001 | Pedersen et al. |
| 6,214,226 | B1 * | 4/2001 | Kobayashi et al. ..... 210/500.23 |
| 6,214,231 | B1 | 4/2001 | Cote et al. |
| 6,280,626 | B1 | 8/2001 | Miyashita et al. |
| 6,284,135 | B1 | 9/2001 | Ookata |
| 6,294,039 | B1 | 9/2001 | Mahendran et al. |
| 6,303,035 | B1 | 10/2001 | Cote et al. |
| 6,319,411 | B1 | 11/2001 | Cote |
| 6,325,928 | B1 | 12/2001 | Pedersen et al. |
| 6,325,938 | B1 | 12/2001 | Miyashita et al. |
| RE37,549 | E | 2/2002 | Mahendran et al. |
| 6,402,955 | B2 | 6/2002 | Ookata |
| 6,555,005 | B1 | 4/2003 | Zha et al. |
| 6,620,319 | B2 * | 9/2003 | Behmann et al. ....... 210/321.69 |
| 6,683,823 | B2 * | 1/2004 | Saga et al. ............... 369/13.05 |
| 6,706,189 | B2 * | 3/2004 | Rabie et al. .................. 210/636 |
| 6,969,465 | B2 * | 11/2005 | Zha et al. .................... 210/636 |
| 7,087,173 | B2 * | 8/2006 | Cote et al. ................... 210/650 |

FOREIGN PATENT DOCUMENTS

| | | | |
|---|---|---|---|
| DE | 10045227 C1 | 2/2002 | |
| EP | 0427376 | 5/1991 | |
| EP | 0 598 909 A1 | 6/1994 | |
| EP | 0 734 758 | 10/1996 | |
| EP | 1213048 | 6/2002 | |
| GB | 2120952 A | 12/1983 | |
| JP | 61-107905 | 5/1986 | |
| JP | 61-167407 | 7/1986 | |
| JP | S63-38884 | 7/1986 | |
| JP | 61-192309 | 8/1986 | |
| JP | 61-242607 | 10/1986 | |
| JP | 61-263605 | 11/1986 | |
| JP | 61-291007 | 12/1986 | |
| JP | 61-293504 | 12/1986 | |
| JP | 62-004408 | 1/1987 | |
| JP | 62-114609 | 5/1987 | |
| JP | 62-144712 | 6/1987 | |
| JP | 62-155906 | 7/1987 | |
| JP | 62-201610 | 9/1987 | |
| JP | 62-250908 | 10/1987 | |
| JP | 63-143905 | 6/1988 | |
| JP | SHO63-143905 | * 6/1988 | |
| JP | 2095422 | 4/1990 | |
| JP | 02-164423 | 6/1990 | |
| JP | 02-293093 | 12/1990 | |
| JP | 3684426 | * 3/1991 | |
| JP | 03-131324 | 6/1991 | |
| JP | 3131092 | 6/1991 | |
| JP | 04-180821 | 6/1992 | |
| JP | 04-197487 | 7/1992 | |
| JP | 04-247295 | 9/1992 | |
| JP | 04-250898 | 9/1992 | |
| JP | 5015892 | 1/1993 | |
| JP | 05-285348 | 2/1993 | |
| JP | 5123540 | 5/1993 | |
| JP | 5125543 | 5/1993 | |
| JP | 05-154362 | 6/1993 | |
| JP | 05-154476 | 6/1993 | |
| JP | 5063632 U | 8/1993 | |
| JP | 05-285349 | 11/1993 | |
| JP | 06-023245 | 2/1994 | |
| JP | 06-218237 | 8/1994 | |
| JP | 06-218238 | 8/1994 | |
| JP | 06-218361 | 8/1994 | |
| JP | 6246264 | 9/1994 | |
| JP | 06-285496 | 11/1994 | |
| JP | 06-343837 | 12/1994 | |
| JP | 07-000770 | 1/1995 | |
| JP | 07-024272 | 1/1995 | |
| JP | 7024264 | 1/1995 | |
| JP | 7024267 | 1/1995 | |
| JP | 07-047245 | 2/1995 | |
| JP | 7031853 | 2/1995 | |
| JP | 07-136470 | 5/1995 | |
| JP | 07-136471 | 5/1995 | |
| JP | 07-185268 | 7/1995 | |
| JP | 7178320 | 7/1995 | |
| JP | 7178321 | 7/1995 | |
| JP | 07-275665 | 10/1995 | |
| JP | 07-289860 | 11/1995 | |
| JP | 08-010585 | 1/1996 | |
| JP | 08-131785 | 5/1996 | |
| JP | 08-206472 | 8/1996 | |
| JP | 08-215548 | 8/1996 | |
| JP | 08-252438 | 10/1996 | |
| JP | 08-257372 | 10/1996 | |
| JP | 08-281082 | 10/1996 | |
| JP | 09-141063 | 6/1997 | |
| JP | 09-220569 | 8/1997 | |
| JP | 09-290261 | 11/1997 | |
| JP | 10-277599 | 10/1998 | |
| JP | 2000-300965 | * 10/2000 | |
| JP | 3283008 | 5/2002 | |
| SU | 1692626 | 11/1991 | |
| WO | WO93/02779 | 2/1993 | |
| WO | WO93/23152 | 11/1993 | |
| WO | WO 94/11094 | 5/1994 | |
| WO | WO96/07470 | 3/1996 | |
| WO | WO97/06880 | 2/1997 | |

| | | |
|---|---|---|
| WO | WO98/28066 | 7/1998 |

OTHER PUBLICATIONS

English language abstract of JP07-289860.
English language abstract of JP07-136471.
English language abstract of JP61-291007.
English language abstract of JP61-293504.
English language abstract of JP61-167407.
English language abstract of JP61-242607.
English language abstact of JP61-192309.
English language abstract of JP63-143905.
English language abstract of JP06-343837.
English language abstract of JP04-247295.
English language abstract of JP04-180821.
English language abstract of JP04-197487.
English language abstract of JP02-293093.
English language abstract of JP07-136470.
English language abstract of JP03-131324.
English language abstract of JP62-201610.
English language abstract of JP07-185268.
English language abstract of JP05-285349.
English language abstract of SU 1692626.
English language abstract of JP07-000770.
English language abstract of JP07-275665.
English language abstract of JP08-010585.
English language abstract of JP09-141063.
English language abstract of JP62-114609.
English language abstract of JP 02-164423.
English language abstract of JP62-250908.
English language abstract of JP05-285348.
English language abstract of JP 06-285496.
English language abstract of JP06-218361.
English language abstract of JP06-218238.
English language abstract of JP61-263605.
English language abstract of JP05-154362.
English language abstract of JP06-023245.
English language abstract of JP08-206472.
English language abstract of JP09-290261.
English language abstract of JP08-131785.
English language abstract of JP06-218237.
English language abstract of JP09-308882, Dec. 2, 1997, Kubota Corp.
English language abstract of JP09-248432, Sep. 22, 1997, Kubota Corp.
English language abstract of JP07-132213, May 23, 1995, Ebara Corp.
English language abstract of JP10-277599.
English language abstract of JP08-257372.
English language abstract of JP07-227526, Aug. 29, 1995, Nitto Denko Corp.
English language abstract of JP61-197005, Sep. 1, 1986, Ebara Corp.
English language abstract of JP08-215548.
English language abstract of JP61-107905.
English language abstract of JP62-004408.
English language abstract of JP07-024272.
English language abstract of JP08-252438.
English language abstract of JP01-293103, Nov. 27, 1989, Kurita Water Ind Ltd.
English language abstract of JP04-126528, Apr. 27, 1992, Ebara Infilco Co. Ltd.
English language abstract of JP07-116482, May 9, 1995, Kurita Water Ind. Ltd.
English language abstract of JP06-277664, Oct. 4, 1994, Daicel Chem Ind Ltd.
English language abstract of JP05-184884, Jul. 27, 1993, Mitsubishi Rayon Co. Ltd.
English language abstract of JP04-131182, May 1, 1992, Ebara Infilco Co. Ltd et al.
English language abstract of JP09-138298, May 27, 1997, Hitachi Ltd et al.
English language abstract of JP03-000114, Jan. 7, 1991, Akua Runesansu Gijutsu.
English language abstract of WO90/11120, Oct. 4, 1990, Int Applied Sciences Inc.
English language abstract of JP08-281082.
English language abstract of JP61-157306, Jul. 17, 1986, Ebara Corp.
English language abstract of JP09-220569.
English language abstract of JP05-154476.
Declaration for Reissue Application executed Jun. 14, 1999 in File history of U.S. Patent No. RE37,549.
Amendment dated Jan. 8, 1998 in file history of U.S. Patent No. 5,783,083, incorporated by reference in Declaration for Reissue Application executed Jun. 14, 1999 in File history of U.S. Patent No. RE37,549.
Declaration Under 37 CFR 1.132 of Steven Pedersen executed Jan. 5, 1998 in file history of U.S. Patent No. 5,783,083, incorporated by reference in Declaration for Reissue Application executed Jun. 14, 1999 in File history of U.S. Patent No. Re37,549.
Declaration Under 37 CFR 1.132 of Kenneth Goodboy executed Dec. 27, 1997 in file history of U.S Patent No. 5,783,083, incorporated by reference in Declaration for Reissue Application executed Jun. 14, 1999 in File history of U.S. Patent No. RE37,549.
Office Action mailed Nov. 5, 1999 in File history of U.S. Patent No. RE37,549.
Supplemental Declaration for Reissue Application executed Mar. 3, 2000 in File history of U.S. Patent No. Re37,549.
Amendment dated Mar. 4, 2000in File history of U.S. Patent No. RE37,549.
Supplemental Amendment dated Mar. 20, 2000 in File history of U.S. Patent No. RE37,549.
Office Action mailed Mar. 31, 2000 in File history of U.S. Patent No. RE37,549.
Amendment dated May 9, 2000 in File history of U.S. Patent No. RE37,549.
Third Supplemental Declaration for Reissue Application executed May 8, 2000 in File history of U.S. Patent No. RE37,549.
Notice of Allowability dated Jun. 1, 2000 in File history of U.S. Patent No. RE37,549.
Supplemental Declaration for Reissue Application executed Nov. 7, 2000 in File history of U.S. Patent No. RE37,549.
Preliminary Amendment dated Nov. 6, 2000 in File history of U.S. Patent No. RE37,549.
Office Action mailed Feb. 6, 2001 in File history of U.S. Patent No. RE37,549.
Amendment dated May 4, 2001 in File history of U.S. Patent No. RE37,549.
Notice of Allowability dated May 29, 2001 in File history of U.S. Patent No. RE37,549.
Kaiya et al., "Water Purification Using Hollow Fiber Microfiltration Membranes", $6^{th}$ World Filtration Congress, Nagoya, 1993, pp. 813-816.
"Direct Solid-Liquid Separation Using Hollow Fiber Membrane in an Activated Sludge Aeration Tank" by K. Yamamoto; M. Hiasa; T. Mahmood and T. Matsuo; Wat. Sci. Tech. vol. 21, Brighton, pp. 43-54 (1989).
"Organic Stabilization And Nitrogen Removal In Membrane Separation Bioreactor For Domestic Wastewater Treatment" by C. Chiemchaisri, Y.K. Wong, T. Urase and K. Yamamoto, presented at Membrane Technology in Wastewater Management, Cape Town, Mar. 2-5, 1992.
"Optimal fiber spacing in externally pressurized hollow fiber module for solid liquid separation", by Kiat, Yamoto et al., Water Science Technology vol. 26, pp. 1245-1254, (1992).
"Household membrane bioreactor in domestic wastewater treatment", by Chiemchaisri et al. Water Science Technology vol. 27, No. 1, pp. 171-178, (1993).
"Organic wastewater treatment by activated sludge process using integrated type membrane separation", by Futamura et al. Proceedings IDA and WRPC World Conference on Desalination and Water Treatment, Nov. 1993, vol. 1, pp. 223-230.
"Integrated membrane-filtration activated-sludge wastewater treatment system", by Onishi and Futamura Proceedings 1994 MIE International Forum and Symposium on Global Environment and Friendly Energy Technology, pp. 365-368.

"Integrated membrane filtration activated sludge wastewater treatment system", International Symposium on Fibre Science and Technology (ISF'94), Yokohama, Oct. 1994.

ZeeWeed 145 Product Data Sheet, Jun. 1994.

United States District Court, Southern District of California, CV No. 03-CV-1996W-JFS, "Complaint for Patent Infringement; Demand for Jury Trial", Oct. 8, 2003.

United States District Court, Southern District of California, CV No. 03-CV-1996B-AJB, "Defendant United States Filter Corporation's First Amended Answer To Complaint and Counterclaims", Jan. 12, 2005.

United States District Court, Southern District of California, CV No. 03-CV-1996B-(AJB), "Order Construing Claims For U.S. Patent No. 6,620,319", Nov. 8, 2004.

United States District Court, Southern District of California, CV No. 03-CV-1996-B (AJB), "Decision on Bifurcated Trial of Issue of Invalidity of United States Patent No. 6,620,319", May 3, 2005.

Opinions in United States Court of Appeal for the Federal Circuit 2006-1266, -1267, Decided Nov. 7, 2007.

Mitsui Constr, Partial English Translation of JP 6246264, Nov. 1995.

Mitsui Constr, English Language Abstract of JP 6246264, Nov. 1995.

Mitsubishi Rayon Co., English Language Abstract of JP 7178321, Jul. 1995.

Osamu Futamura, Masuo Katoh, Joyosi Takeuchi, Organic Waste Water Treatment by Activated Sludge Process Using Integrated Type Membrane Separation, (Desalination), Issue. 98, 1994, pp. 17-25.

Richard G. Sudak, William R. Dunivin. Pilot Plant Testing of Direct Filtration, Microfiltration, and Reverse Osmosis at Water Factory 21. National Water Research Institute: Microfiltration for Water Treatment Symposium. Aug. 25 and 26, 1994. Irvine, California.

Yoshio Taniguchi. State of the Art of Microfiltration Technology for Drinking Water and Waste Water Treatment in Japan. Aug. 1994. pp. 13-22. Japan.

Mitsubishi Rayon Co., English Language Abstract of JP 7024264, Jan. 1995.

Nitto Denko Corp., English Language Abstract of JP 7031853, Feb. 1995.

Toshiba Corp., English Language Abstract of JP 5015892, Jan. 1993.

Mitsubishi Rayon Eng. Co. Ltd. and Mitsubishi Rayon Co. Ltd., English Language Abstract of JP 62-155906, Jul. 1987.

Takaaki Tanaka, Hiroshi Itoh, Kazutaka Itoh, Kazuhiro Nakanishi, Takaaki Kume, Ryuichi Matsuno. Crossflow Filtration of Baker's Yeast with Periodical Stopping of Permeation Flow and Bubbling. Biotechnology and Engineering, vol. 47, No. 3, pp. 401-404 (Aug. 5, 1995).

Kubota Corp., English Language Abstract of JP 5123540, May 1993.

Shin Etsu Chem Co Ltd., English Language Abstract of JP 5125543, May 1993.

NEC Corp., English Language Abstract of JP 3131092, Jun. 1991.

Mitsubishi Rayon Co. Ltd., English Language Abstract of JP 7024267, Jan. 1995.

Mitsubishi Rayon Co. Ltd., English Language Abstract of JP 3283008, May 2002.

Mitsubishi Rayon Co. et al., English Language Abstract of JP 7178320, Jul. 1995.

Aqua Renaissance Gijutsu, English Language Abstract of JP 2095422, Aug. 1994.

C. Chiemchaisri et al. "Effect of Temperature on Nitrogen Removal in Membrane Separation Bioreactor", International Membrane Science and Technology Conference, Nov. 10-12, 1992.

S. Vigneswaran, et al., "Membrane Bioreactor in Domestic Wastewater Treatment a Bench-Scale Study", International Membrane Science and Technology Conference, Nov. 10-12, 1992.

S. Vigneswaran, et al., "Application of Microfiltration for Water and Wastewater Treatment", Environmental Sanitation Information Center, Asian Institute of Technology, Jun. 1991.

J.A. Howell, et al., "Yeast Cell Microfiltration: Flux Enhancement in Baffled and Pulsatile Flow Systems", Journal of Membrane Science, 80 (1993) 59-71.

C.D. Bertram, et al., "Flux Enhancement in Crossflow Microfiltration Using a Collapsible-Tube Pulsation Generator", Journal of Membrane Science, 84 (1993) 279-292.

* cited by examiner

APPARATUS FOR WITHDRAWING PERMEATE USING AN IMMERSED VERTICAL SKEIN OF HOLLOW FIBRE MEMBRANES

This is a continuation of U.S. Ser. No. 10/661,519 filed Sep. 15, 2003, now abandoned which is a continuation of U.S. Ser. No. 09/849,573 filed May 4, 2001, issued as U.S. Pat. No. 6,620,319, which is a continuation of U.S. Ser. No. 09/507,438 filed Feb. 19, 2000 issued as U.S. Pat. No. 6,294,039; which is a division of U.S. application Ser. No. 09/258,999, filed Feb. 26, 1999, issued as U.S. Pat. No. 6,042,677; which is a division of U.S. application Ser. No 08/896,517, filed Jun. 16, 1997, issued as U.S. Pat. No. 5,910,250; which is a continuation-in-part of U.S. application Ser. No. 08/514,119, filed Aug. 11, 1995, issued as U.S. Pat. No. 5,639,373; and which application Ser. No. 08/896,517 is a continuation-in-part application of U.S. application Ser. No. 08/690,045, filed Jul. 31, 1996, issued as U.S. Pat. No. 5,783,083 which is an application claiming the benefit under 35 USC 119(e) of U.S. Provisional Application Ser. No. 60/012,921 filed Mar. 5, 1996 and a continuation-in-part of U.S. application Ser. No. 08/514,119, filed Aug. 11, 1995, issued as U.S. Pat. No. 5,639,373. PCT/CA96/00536 was filed on Aug. 8, 1996, published as WO97/006880, and claimed priority from U.S. Pat. Nos. 08/514,119 and 08/690,045. The disclosure of all the patents and applications listed in this paragraph are hereby incorporated by this reference to them as if they were fully set forth herein.

FIELD OF THE INVENTION

This invention relates to a membrane filtration apparatus.

BACKGROUND OF THE INVENTION

The term "vertical skein" in the title (hereafter "skein" for brevity), specifically refers to an integrated combination of structural elements including (i) a multiplicity of vertical fibers of substantially equal length; (ii) a pair of headers in each of which are potted the opposed terminal portions of the fibers so as to leave their ends open; and, (iii) permeate collection means held peripherally in fluid-tight engagement with each header so as to collect permeate from the ends of the fibers.

The term "fibers" is used for brevity, to refer to "hollow fiber membranes" of porous or semipermeable material in the form of a capillary tube or hollow fiber. The term "substrate" refers to a multicomponent liquid feed. A "multicomponent liquid feed" in this art refers, for example, to fruit juices to be clarified or concentrated; wastewater or water containing particulate matter; proteinaceous liquid dairy products such as cheese whey, and the like. The term "particulate matter" is used to refer to micron-sized (from 1 to about 44 µm) and sub-micron sized (from about 0.1 µm to 1 µm) filterable matter which includes not only particulate inorganic matter, but also dead and live biologically active microorganisms, colloidal dispersions, solutions of large organic molecules such as fulvic acid and humic acid, and oil emulsions.

The term "header" is used to specify a solid body in which one of the terminal end portions of each one of a multiplicity of fibers in the skein, is sealingly secured to preclude substrate from contaminating the permeate in the lumens of the fibers. Typically, a header is a continuous, generally rectangular parallelpiped of solid resin (thermoplastic or thermosetting) of arbitrary dimensions formed from a natural or synthetic resinous material. In the novel method described hereinbelow, the end portions of individual fibers are potted in spaced-apart relationship in cured resin, most preferably by "potting" the end portions sequentially in at least two steps, using first and second potting materials. The second potting material (referred to as "fixing material") is solidified or cured after it is deposited upon a "fugitive header" (so termed because it is removable) formed by solidifying the first liquid. Upon removing the fugitive header, what is left is the "finished" or "final" header formed by the second potting material. Of course, less preferably, any prior art method may be used for forming finished headers in which opposed terminal end portions of fibers in a stack of arrays are secured in proximately spaced-apart relationship with each other.

The '424 patent required potting the opposed ends of a frameless array of fibers and dispensed with the shell of a module; it was an improvement on two preceding configurations disclosed in U.S. Pat. Nos. 5,182,019, and 5,104,535, each of which used frameless arrays and avoided potting the fibers. The efficiency of gas-scrubbing a '424 array was believed to be due, at least in large part, to a substantial portion of the fibers of the fibers in the array lying in transverse relationship to a mass of rising bubbles, referred to herein as a "column of rising bubbles", so as to intercept the bubbles. Specific examples are illustrated in FIGS. 9, 9A, 10 and 11 of the '424 patent.

A '424 "array" referred to a bundle of arcuate fibers the geometry of which array was defined by the position of a pair of transversely spaced headers in which the fibers were potted. In the '424 array, as in the array of this invention, each fiber is free to move independently of the others, but the degree of movement in the '424 is unspecified and arbitrary, while in the vertical skein of this invention, movement is critically restricted by the defined length of the fibers between opposed headers. Except for their opposed ends being potted, there is no physical restraint on the fibers of a skein. To avoid confusion with the term "array" as used for the '424 bundle of arcuate fibers, the term "skein fibers" is used herein to refer to plural arrays. An "array" in this invention refers to plural, essentially vertical fibers of substantially equal lengths, the one ends of each of which fibers are closely spaced-apart, either linearly in the transverse (y-axis herein) direction to provide at least one row, and typically plural rows of equidistantly spaced apart fibers. Less preferably, a multiplicity of fibers may be spaced in a random pattern. Typically, plural arrays are potted in a header and enter its face in a generally x-y plane (see FIG. 5). The width of a rectangular parallelpiped header is measured along the x-axis, and is the relatively shorter dimension of the rectangular upper surface of the header; and, the header's length, which is its relatively longer dimension, is measured along the y-axis.

This invention is particularly directed to relatively large systems for the microfiltration of liquids, and capitalizes on the simplicity and effectiveness of a configuration which dispenses with forming a module in which the fibers are confined. As in the '424 patent, the novel configuration efficiently uses a clean-sing gas, typically air, discharged near the base of a skein to produce bubbles in a specified size range, and in an amount large enough to scrub the fibers, and to cause the fibers to scrub themselves against one another. Unlike in the '424 system the fibers in a skein are vertical and do not present an arcuate configuration above a horizontal plane through the horizontal center-line of a header. As a result, the path of the rising bubbles is generally parallel to the fibers and is not crossed by the fibers of a vertical skein. Yet the bubbles scrub the fibers. The restrictedly swayable fibers, because of their defined length, do not get entangled, and do not abrade each other excessively, as is likely in the '424 array. The defined length of the fibers herein minimizes (i) shearing forces where the upper fibers are held in the upper header, (ii) excessive rotation of the upper portion of the fibers, as well as (iii) excessive abrasion between fibers. The fibers of this invention are confined so as to sway in a "zone of confinement" (or "bubble zone") through which bubbles rise along the outer surfaces of the fibers. The side-to-side displacement of an intermediate portion of each fiber within the bubble zone is restricted by the fiber's length. The bubble zone, in turn, is determined by one or more columns of vertically rising gas bubbles, preferably of air, generated near the base of a skein.

Since there is no module in the conventional sense, the main physical considerations which affect the operation of a vertical skein in a reservoir of substrate relate to intrinsic considerations, namely, (a) the fiber chosen, (b) the amount of air used, and (c) the substrate to be filtered. Such considerations include the permeability and rejection properties of the fiber, the process flow conditions of substrate such as pressure, rate of flow across the fibers, temperature, etc., the physical and chemical properties of the substrate and its components, the relative directions of flow of the substrate (if it is flowing) and permeate, the thoroughness of contact of the substrate with the outer surfaces of the fibers, and still other parameters, each of which has a direct effect on the efficiency of the skein. The goal is to filter a slow moving or captive substrate in a large container under ambient or elevated pressure, but preferably under essentially ambient pressure, and to maximize the efficiency of a skein which does so (filters) practically and economically.

In the skein of this invention, all fibers in the plural rows of fibers, staggered or not, rise generally vertically while fixedly held near their opposed terminal portions in a pair of opposed, substantially identical headers to form the skein of substantially parallel, vertical fibers. This skein typically includes a multiplicity of fibers, the opposed ends of which are potted in closely-spaced-apart profusion and bound by potting resin, assuring a fluid-tight circumferential seal around each fiber in the header and presenting a peripheral boundary around the outermost peripheries of the outermost fibers. The position of one fiber relative to another in a skein is not critical, so long as all fibers are substantially codirectional through one face of each header, open ends of the fibers emerge from the opposed other face of each header, and substantially no terminal end portions of fibers are in fiber-to-fiber contact. We found that the skein of fibers, deployed to be restrictedly swayable, were as ruggedly durable as they were reliable in operation.

The fibers are stated to be "restrictedly swayable", because the extent to which they may sway is determined by the free length of the fibers relative to the fixedly spaced-apart headers, and the turbulence of the substrate. When a large number of fibers is used in a skein, as is typically the case herein, the movement of a fiber adjacent to others may be modulated by the movement of the others, but the movement of fibers within a skein is constricted. This system is therefore limited to the use of a skein of fibers having a critically defined length relative to the vertical distance between headers of the skein. The defined length limits the side-to-side movement of the fibers in the substrate in which they are deployed, except near the headers where there is negligible movement.

In the prior art, a vertical skein of fibers in a substrate is typically avoided due to expected problems relating to channelling of the feed. However, because the fibers are restrictedly swayable in a "bubble zone" as described herebelow, the fibers are substantially evenly contacted over their individual surfaces with substrate and provide filtration performance based on a maximized surface which is substantially the sum of the surface areas of all fibers in contact with the substrate. Moreover, because of the ease with which the substrate coats the surfaces of the vertical fibers in a skein, and the accessibility of those surfaces by air bubbles, the fibers may be densely arranged in a header to provide a large membrane surface of up to 1000 m² and more.

One header of a skein is displaceable in any direction relative to the other, either longitudinally (x-axis) or transversely (y-axis), only prior to the headers being vertically fixed in spaced apart parallel relationship within a reservoir, for example, by mounting one header above another, against a vertical wall of the reservoir which functions as a spacer means. This is also true prior to spacing one header above another with other spacer means such as bars, rods, struts, I-beams, channels, and the like, to assemble plural skeins into a bank of skeins ("bank" for brevity), in which bank a row of lower headers is directly beneath a row of upper headers. After assembly into a bank, a segment intermediate the potted ends of each individual fiber is displaceable along either the x- or the y-axis, because the fibers are loosely held in the skein. There is essentially no tension on each fiber because the opposed faces of the headers are spaced apart at a distance less than the length of an individual fiber.

By operating at ambient pressure, mounting the headers of the skein within a reservoir of substrate, and by allowing the fibers restricted movement within the bubble zone in a substrate, we minimize damage to the fibers. Because, a header secures at least 10, preferably from 50 to 50,000 fibers, each generally at least 0.5 m long, in a skein, it provides a high surface area for filtration of the substrate.

The fibers divide a reservoir into a "feed zone" and a withdrawal zone referred to as a "permeate zone". The feed of substrate is introduced externally (referred to as "outside-in" flow) of the fibers, and resolved into "permeate" and "concentrate" streams. The skein, or a bank of skeins of this invention Is most preferably used for microfiltration with "outside-in" flow. Typically a bank is used in a relatively large reservoir having a volume in excess of 10 L (liters), preferably in excess of 1000 L, such as a flowing stream, more typically a reservoir (pond or tank). Most typically, a bank or plural banks with collection means for the permeate, are mounted in a tank under atmospheric pressure, and permeate is withdrawn from the tank.

Where a bank or plural banks of skeins are placed within a tank or bio-reactor, and no liquid other than the permeate is removed the tank is referred to as a "dead end tank". Alternatively, a bank or plural banks may be placed within a bioreactor, permeate removed, and sludge disposed of; or, in a tank or clarifier used in conjunction with a bioreactor, permeate removed, and sludge disposed of.

Operation of the system relies upon positioning at least one skein, preferably a bank, close to a source of sufficient air or gas to maintain a desirable flux, and, to enable permeate to be collected from at least one header. A desirable flux is obtained, and provides the appropriate transmembrane pressure differential of the fibers under operating process conditions. "Transmembrane pressure differential" refers to the pressure difference across a membrane wall, resulting from the process conditions under which the membrane is operating.

The relationship of flux to permeability and transmembrane pressure differential is set forth by the equation:

$$J = k\Delta P$$

wherein, J=flux; k=permeability constant;
$\Delta P$=transmembrane pressure differential; and $k = 1/\mu Rm$
where $\mu$=viscosity of water and, Rm=membrane resistance.

The transmembrane pressure differential is preferably generated with a conventional non-vacuum pump if the transmembrane pressure differential is sufficiently low in the range from 0.7 kPa (0.1 psi) to 101 kPa (1 bar), provided the pump generates the requisite suction. The term "non-vacuum pump" refers to a pump which generates a net suction side pressure difference, or, net positive suction head (NPSH), adequate to provide the transmembrane pressure differential generated under the operating conditions. By "vacuum pump" we refer to one capable of generating a suction of at least 75 cm of Hg. A pump which generates minimal suction may be used if an adequate "liquid head" is provided between the surface of the substrate and the point at which permeate is withdrawn; or, by using a pump, not a vacuum pump. A non-vacuum pump may be a centrifugal, rotary, crossflow, flow-through, or other type. Moreover, as explained in greater detail below, once the permeate flow is induced by a pump, the pump may not be necessary, the permeate continuing to flow under a "siphoning effect". Clearly, operating with fibers subjected to a transmembrane pressure differential in the range up to 101 kPa (14.7 psi), a non-vacuum pump will provide adequate service in a reservoir which is not pressurized; and, in the range from 101 kPa to about 345 kPa (50 psi), by superatmospheric pressure generated by a high liquid head, or, by a pressurized reservoir.

The fibers are not required to be subjected to a narrowly critical transmembrane pressure differential though fibers which operate under a small transmembrane pressure differential are preferred. A fiber which operates under a small transmembrane pressure differential in the range from about 0.7 kPa (0.1 psi) to about 70 kPa (10 psi) may produce permeate under gravity alone, if appropriately positioned relative to the location where the permeate is withdrawn. In the range from 3.5 kPa (0.5 psi) to about 206 kPa (30 psi) a relatively high liquid head may be provided with a pressurized vessel. The longer the fiber, which greater the area and the more the permeate.

In the specific instance where a bank is used in combination with a source of cleansing gas such as air, both to scrub the fibers and to oxygenate a mixed liquor substrate, most, if not all of the air required, is introduced either continuously or intermittently, near the base of the fibers near the lower header. The perforations through which the gas is discharged near the header are located close enough to the fibers so as to provide columns of relatively large bubbles, preferably larger than about 1 mm in nominal diameter, which codirectionally contact the fibers and flow vertically along their outer surfaces, scrubbing them. The outer periphery of the columns of bubbles define the zone of confinement in which the scrubbing force exerted by the bubbles on the fibers, keeps their surfaces sufficiently free of attached microorganisms and deposits of inanimate particles to provide a relatively high and stable flow of permeate over many weeks, if not months of operation. The significance of this improvement will be better appreciated when it is realized that the surfaces of fibers in conventional modules are cleaned nearly every day, and sometimes more often.

Because this system, like the '424 system, does away with using a shell, there is no void space within a shell to be packed with fibers; and, because of gas being introduced proximately to, and near the base of skein fibers, there is no need to maintain a high substrate velocity across the surface of the fibers to keep the surfaces of the fibers clean. As a result, there is virtually no limit to the number of restrictedly swayable fibers which may be used in a skein, the practical limit being set by (i) the ability to pot the ends of the fibers reliably; (ii) the ability to provide sufficient air to the surfaces of essentially all the fibers, and (iii) the number of banks which may be deployed in a tank, pond or lake, the number to be determined by the size of the body of water, the rate at which permeate is to be withdrawn, and, the cost of doing so.

Typically, a relatively large number of long fibers, at least 100, is used in a skein of restrictedly swayable fibers, the fibers operate under a relatively low transmembrane pressure differential, and permeate is withdrawn with a non-vacuum pump. If the liquid head, measured as the vertical distance between the level of substrate and the level from which permeate is to be withdrawn, is greater than the transmembrane pressure differential under which the fiber operates, the permeate will be separated from the remaining substrate, due to gravity.

Irrespective of whether a non-vacuum pump, vacuum pump, or other type of pump is used, or permeate is withdrawn with a siphoning effect, it is essential that the fibers in a skein be positioned in a generally vertical attitude, rising above the lower header. An understanding of how a vertical skein operates will make it apparent that, since fibers in a skein are anchored at the base of the skein by the lower header, the specific gravity of the fibers relative to that of the substrate is immaterial and will not affect their vertical disposition.

The unique method of forming a header disclosed herein allows one to position a large number of fibers, in closely-spaced apart relationship, randomly relative to one another, or, in a chosen geometric pattern, within each header of synthetic resinous material. It is preferred to position the fibers in arrays before they are potted to ensure that the fibers are spaced apart from each other precisely, and, to avoid wasting space on the face of a header; it is essential, for greatest reliability, that the fibers not be contiguous. By sequentially potting the terminal portions of fibers in stages as described herein, the fibers may be cut to length in an array, either after, or prior to being potted. The use of a razor-sharp knife, or scissors, or other cutting means to do so, does not decrease the open cross-sectional area of the fibers' bores ("lumens"). The solid resin forms a circumferential seal around the exterior terminal portions of each of the fibers, open ends of which protrude through the permeate-discharging face of each header, referred to as the "aft" face.

Further, one does not have to cope with the geometry of a frame, the specific function of which is to hold fibers in a particular arrangement within the frame. In a skein, the sole function of the header spacing means is to maintain a fixed vertical distance between headers which are not otherwise spaced apart. In a skein of this invention, there is no frame.

The skein of this invention is most preferably used to treat wastewater in combination with a source of an oxygen-containing gas which is bubbled within the substrate, near the base of a lower header, either within a skein or between adjacent skeins in a bank, for the specific purpose of scrubbing the fibers and oxygenating the mixed liquor in activated sludge, such as is generated in the bioremediation of wastewater. It was found that, as long as enough air is introduced near the base of each lower header to keep the fibers awash in bubbles, and the fibers are restrictedly swayable in the activated sludge, a build-up of growth of microbes on the surfaces of the fibers is inhibited while permeate is directly withdrawn from activated sludge, and excellent flow of permeate is maintained over a long period. Because essentially all surface portions of the fibers are contacted by successive bubbles as they rise, whether the air is supplied continuously or intermittently, the fibers are said to be "awash in bubbles."

The use of an array of fibers in the direct treatment of activated sludge in a bioreactor, is described in an article titled "Direct Solid-liquid Separation Using Hollow Fiber Membrane in an Activated Sludge Aeration Tank" by Kazuo Yamamoto et al in Wat. Sci. Tech. Vol. 21, Brighton pp 43-54, 1989, and discussed in the '424 patent, the disclosure of which is incorporated by reference thereto as if fully set forth herein. The relatively poor performance obtained by Yamamoto et al was mainly due to the fact that they did not realize the critical importance of maintaining flux by aerating a skein of fibers from within and beneath the skein. They did not realize the necessity of thoroughly scrubbing substantially the entire surfaces of the fibers by flowing bubbles through the skein to keep the fibers awash in bubbles. This requirement becomes more pronounced as the number of fibers in the skein increases.

As will presently be evident, since most substrates are contaminated with micron and submicron size particulate material, both organic and inorganic, the surfaces of the fibers in any practical membrane device must be maintained in a clean condition to obtain a desirable specific flux. To do this, the most preferred use of the skein as a membrane device is in a bank, in combination with a gas-distribution means, which is typically used to distribute air, or oxygen-enriched air between the fibers, from within the skein, or between adjacent skeins, at the bases thereof.

Tests using the device of Yamamoto et al indicate that when the air is provided outside the skein the flux decreases much faster over a period of as little as 50 hr, confirming the results obtained by them. This is evident in FIG. 1 described in greater detail below, in which the graphs show results obtained by Yamamoto et al, and the '424 array, as well as those with the vertical skein, all three assemblies using essentially identical fibers, under essentially identical conditions.

The investigation of Yamamoto et al with downwardly suspended fibers was continued and recent developments were reported in an article titled "Organic Stabilization and Nitrogen Removal in Membrane Separation Biois reactor for Domestic Wastewater Treatment" by C. Chiemchaisri et al delivered in a talk to the Conference on Membrane Technology in Wastewater Management, in Cape Town, South Africa, Mar. 2-5, 1992, also discussed in the '424 patent. The fibers were suspended downwardly and highly turbulent flow of water in alternate directions, was essential.

It is evident that the disclosure in either the Yamamoto et al or the Chiemchaisri et al reference indicated that the flow of air across the surfaces of the suspended fibers did little or nothing to inhibit the attachment of microorganisms from the substrate.

SUMMARY OF THE INVENTION

It has been discovered that bubbles of a fiber-cleansing gas ("scrubbing gas") flowing parallel to fibers in a vertical skein are more effective than bubbles which are intercepted by arcuate fibers crossing the path of the rising bubbles. Bubbles of an oxygen-containing gas to promote growth of microbes unexpectedly fails to build-up growth of microbes on the surfaces of the fibers because the surfaces are "vertically air-scrubbed". Deposits of animate and/or inanimate particles upon the surfaces of fibers are minimized when the restrictedly swayable fibers are kept awash in codirectionally rising bubbles which rise with sufficient velocity to exert a physical scrubbing force (momentum provides the energy) to keep the fibers substantially free of deleterious deposits. Thus, an unexpectedly high flux is maintained over a long period during which permeate is produced by outside-in flow through the fibers.

It has also been discovered that permeate may be efficiently withdrawn from a substrate for a surprisingly long period, in a single stage, essentially continuous filtration process, by mounting a pair of headers in vertically spaced apart relationship, one above another, within the substrate which directly contacts a multiplicity of long vertical fibers in a "gas-scrubbed assembly" comprising a skein and a gas-distribution means. The skein has a surface area which is at least >1 $m^2$, and opposed spaced-apart ends of the fibers are secured in spaced-apart headers, so that the fibers, when deployed in the substrate, acquire a generally vertical profile therewithin and sway within the bubble zone defined by at least one column of bubbles. The length of fibers between opposed surfaces of headers from which they extend, is in a critical range from at least 0.1% (percent) longer than the distance separating those opposed faces, but less than 5% longer. Usually the length of fibers is less than 2% longer, and most typically, less than 1% longer, so that sway of the fibers is confined within a vertical zone of movement, the periphery of which zone is defined by side-to-side movement of outer fibers in the skein; and, the majority of the fibers near the periphery move in a slightly larger zone than one defined by the projected area of one header upon the other. Though the distance between headers is fixed during operation, the distance is preferably adjustable to provide an optimum length of fibers, within the aforesaid ranges, between the headers. It has been found that for no known reason, fibers which are more than 5% but less than 10% longer than the fixed distance between the opposed faces of the headers of a skein, tend to shear off at the face; and those 10% longer tend to clump up in the bubble zone.

The terminal end portions of the fibers are secured non-contiguously in each header, that is, the surface of each fiber is sealingly separated from that of another adjacent fiber with cured potting resin. Preferably, for maximum utilization of space on a header, the fibers are deliberately set in a geometrically regular pattern. Typically permeate is withdrawn from the open ends of fibers which protrude from the permeate-discharging aft (upper) face of a header. The overall geometry of potted fibers is determined by a 'fiber-setting form' used to set individual fibers in an array. The skein operates in a substrate held in a reservoir at a pressure in the range from 1 atm to an elevated pressure up to about 10 atm in a pressurized vessel, without being confined within the shell of a module.

It is therefore a general object of this invention to provide a novel, economical and surprisingly trouble-free membrane device, for providing an alternative to both, a conventional module having plural individual arrays therewithin, and also to a frameless array of arcuate fibers; the novel device includes, (i) a vertical skein of a multiplicity of restrictedly swayable fibers, together having a surface area in the range from 1 $m^2$ to 1000 $m^2$, preferably from 10 $m^2$ to 100 $m^2$, secured only in spaced-apart headers; and (ii) a gas-scrubbing means which produces at least one column of bubbles engulfing the skein. A skein includes permeate pans disposed, preferably non-removably, within a substrate held in a reservoir of arbitrary proportions, the reservoir typically having a volume in excess of 100 L (liters), generally in excess of 1000 L. A fluid component is to be selectively removed from the substrate.

It is a specific object of this invention to provide a membrane device having hollow fibers for removing permeate from a substrate, comprising, a skein of a multiplicity of fibers restrictedly swayable in the substrate, the opposed terminal end portions of which fibers in spaced-apart relationship, are potted in a pair of headers, one upper and one lower, each adapted to be mounted in vertically spaced apart generally parallel relationship, one above the other, within the substrate; essentially all the ends of fibers in both headers are open so as to pass permeate through the headers; the fibers in a skein have a length in the range from at least 0.1% greater, but less than 5% greater than the direct distance between opposed faces of the upper and lower headers, so as to present the fibers, when they are deployed, in an essentially vertical configuration; permeate is collected in a collection means, such as a permeate pan; and, permeate is withdrawn through a ducting means including one or more conduits and appropriate valves.

It has also been discovered that skein fibers are maintained sufficiently free from particulate deposits with surprisingly little cleansing gas, so that the specific flux at equilibrium is maintained over a long period, typically from 50 hr to 1500 hr, because the skein is immersed so as to present a generally vertical profile, and, the skein is maintained awash in bubbles either continuously or intermittently generated by a gas-distribution means ("air-manifold"). The air-manifold is disposed adjacent the skein's lower header to generate a column of rising bubbles within which column the fibers are awash in bubbles. A bank of skeins is "gas-scrubbed" with plural air-tubes disposed between the lower headers of adjacent skeins, most preferably, also adjacent the outermost array of the first and last skeins, so that for "n" headers there are "n+1" air-manifolds. Each header is preferably in the shape of a rectangular parallelpiped, the upper and lower headers having the same transverse (y-axis) dimension, so that plural headers are longitudinally stackable (along the x-axis). Common longitudinally positioned linear air-tubes, or, individual, longitudinally spaced apart vertically rising air-tubes, service the bank, and one or more permeate tubes withdraw permeate.

It is therefore a general object of this invention to provide a gas-scrubbed assembly of fibers for liquid filtration, the assembly comprising, (a) bank of gas-scrubbed skeins of fibers which separate a desired permeate from a large body of multicomponent substrate having finely divided particulate matter in the range from 0.1 μm-44 μm dispersed therein, (b) each skein comprising at least 20 fibers having upper and lower terminal portions potted spaced-apart, in upper and lower headers, respectively, the fibers being restrictedly swayable in a bubble zone, and (c) a shaped gas-distribution means adapted to provide a profusion of vertically ascending bubbles near the lower header, the length of the fibers being from at least 0.1% but less than 5% greater than the distance between the opposed faces of the headers. The gas-distribution means has through-passages therein through which gas is flowed at a flow rate which is proportional to the number of fibers. The flow rate is generally in the range from 0.47-14 $cm^3$/sec per fiber (0.001-0.03 scfm/fiber) (standard $ft^3$ per minute per fiber), typically in the range from 1.4-4.2 $cm^3$/sec/fiber (0.003-0.009 scfm/fiber). The surface area of the fibers is not used to define the amount of air used because the air travels substantially vertically along the length of each fiber. The gas generates bubbles having an average diameter in the range from about 0.1 mm to about 25 mm, or even larger.

It is a specific object of this invention to provide the aforesaid novel gas-scrubbed assembly comprising, a bank of vertical skeins and a shaped gas-distribution means for use with the bank, in a substrate in which microorganisms grow, the assembly being used in combination with vertically adjustable spacer means for mounting the headers in vertically spaced apart relationship, and in open fluid communication with collection means for collecting the permeate; means for withdrawing the permeate; and, sufficient air is flowed through the shaped gas-distribution means to generate enough bubbles flowing upwardly through the skein, between and parallel to the fibers so as to keep the surfaces of the fibers substantially free from deposits of live microorganisms as well as small inanimate particles which may be present in the substrate.

It has still further been discovered that a system utilizing a bank of vertical skeins of fibers potted in headers vertically spaced-apart by spacer means, and deployed in a substrate containing particulate material, in combination with a proximately disposed gas-distribution means to minimize fouling of the membranes, may be operated to withdraw permeate under gravity alone, so that the cost of any pump to withdraw permeate is avoided, provided the net positive suction head corresponding to the vertical height between the level of substrate, and the location of withdrawal of permeate, provides the transmembrane pressure differential under which the fibers function in the skein.

It is therefore a general object of this invention to provide the foregoing system in which opposed terminal end portions of skein fibers are essentially free from fiber-to-fiber contact after being potted in upper and lower headers kept vertically spaced-apart with spacer means, the skein being unconfined in a shell of a module and deployed in the substrate without the fibers being supported during operation except by the spacer means which support only the headers; the headers being mounted so that the fibers present a generally vertical profile yet are restrictedly swayable in a zone of confinement defined by rising bubbles; means for mounting each header in open fluid communication with collection means for collecting permeate, and, means for withdrawing the permeate; and, shaped gas-distribution means adapted to generate bubbles from micron-size to 25 mm in nominal diameter, most preferably in the size range from 1 mm to 20 mm, the bubbles flowing upwardly through and parallel to the fibers at a flow rate chosen from the range specified hereabove; whereby the fibers are scrubbed with bubbles and resist the attachment of growing microorganisms and any other particulate matter to the surfaces of the fibers, so as to maintain a desirable specific flux during operation.

Still further, a low cost process has been discovered for treating a multicomponent substrate under pressure ranging from 1-10 atm in a pressurizable vessel, particularly for example, an aqueous stream containing finely divided inorganic matter such as silica, silicic acid, or, activated sludge, when the substrate is confined in a large tank or pond, by using a bank of vertical skeins each comprising restrictedly swayable unsupported fibers potted in headers in open fluid communication with a means for withdrawing permeate, in combination with a source of air which generates bubbles near the lower header.

It is therefore a general object of this invention to provide a process for maintaining relatively clean fiber surfaces in an array of a membrane device while separating a permeate from a substrate, the process comprising, submerging a skein of restrictedly swayable substantially vertical fibers within the substrate so that upper and lower headers of the skein are mounted one above the other with a multiplicity of fibers secured between said headers, the fibers having their opposed terminal portions in open fluid communication with permeate collecting means in fluid-tight connection with said headers; the fibers operating under a transmembrane pressure differential in the range from about 0.7 kPa (0.1 psi) to about 345 kPa (50 psi), and a length from at least 0.1% to about 2% greater than the direct distance between the opposed faces of upper and lower headers, so as to present, when the fibers are deployed, a generally vertical skein of fibers;

maintaining an essentially constant flux substantially the same as the equilibrium flux initially obtained, indicating that the surfaces of the fibers are substantially free from further build-up of deposits once the equilibrium flux is attained; collecting the permeate; and, withdrawing the permeate.

It has still further been discovered that the foregoing process may be used in the operation of an anaerobic or aerobic biological reactor which has been retrofitted with the membrane device of this invention. The anaerobic reactor is a closed vessel and the scrubbing gas is a molecular oxygen-free gas, such as nitrogen.

It is therefore a general object of this invention to provide an aerobic biological reactor retrofitted with at least one gas-scrubbed bank of vertical skeins, each skein made with from 500 to 5000 fibers in the range from 1 m to 3 m long, in combination with a permeate collection means, and to provide a process for the reactor's operation without being encumbered by the numerous restrictions and limitations imposed by a secondary clarification system.

A novel composite header is provided for a bundle of hollow fiber membranes or "fibers", the composite header comprising a molded, laminated body of arbitrary shape, having an upper lamina formed from a "fixing" (potting) material which is laminated to a lower lamina formed from a "fugitive" potting material. The terminal portions of the fibers are potted in the fugitive potting material when it is liquid, preferably forming a generally rectangular parallelpiped in which the open ends of the fibers (until potted) are embedded and plugged, keeping the fibers in closely spaced-apart substantially parallel relationship. The plugged ends of the fibers fail to protrude through the lower (aft) face of the lower lamina, while the remaining lengths of the fibers extend through the upper face of the lower lamina. The upper lamina extends for a height along the length of the fibers sufficient to maintain the fibers in the same spaced-apart relationship relative to one another as their spaced-apart relationship in the lower portion. If desired, the composite header may include additional larimnae, for example, a "cushioning" lamina overlying the fixing lamina, to cushion each fiber around its embedded outer circumference; and, a "gasketing" lamina to provide a suitable gasketing material against which the permeate collection means may be mounted.

BRIEF DESCRIPTION OF THE DRAWINGS

The foregoing and additional objects and advantages of the invention will best be understood by reference to the following detailed description, accompanied by schematic illustrations of preferred embodiments of the invention, in which illustrations like reference numerals refer to like elements, and in which.

DETAILED DESCRIPTION OF PREFERRED EMBODIMENTS

Figure 1:
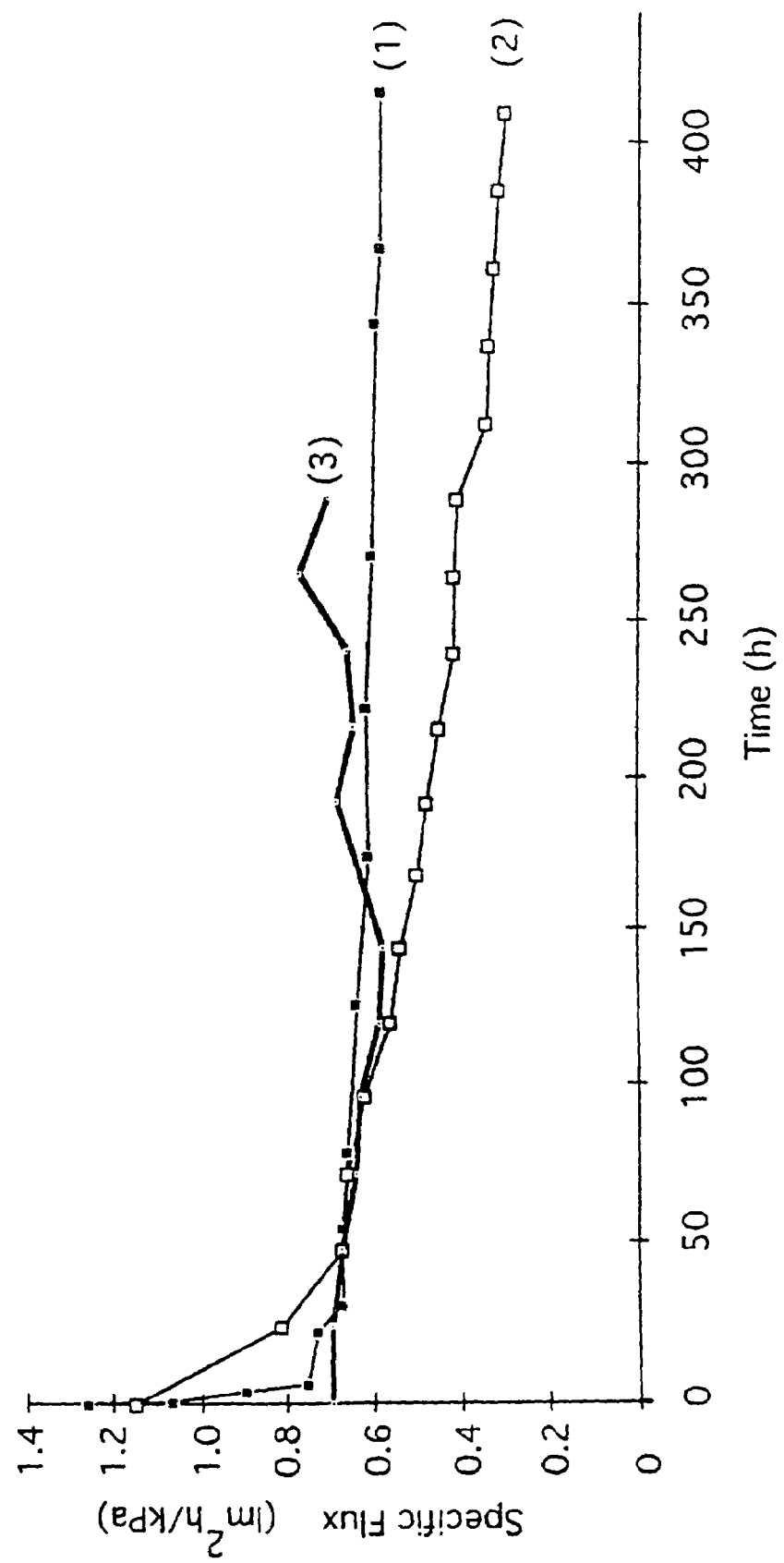
FIG. 1 is a graph in which the variation of flux is plotted as a function of time, showing three curves for three runs made with three different arrays, in each case, using the same amount of air, the identical membranes and the same membrane surface area. The results obtained by Yamamoto et al are plotted as curve 2 (under conditions modified to give them the benefit of doubt as to the experimental procedure employed, as explained below); the flux obtained using the gas-scrubbed assembly of the '424 patent is shown as curve 1; and the flux obtained using the gas-scrubbed assembly of this invention is shown as curve 3.

The skein of this invention may be used in a liquid-liquid separation process of choice, and more generally, in various separation processes. The skein is specifically adapted for use in microfiltration processes used to remove large organic molecules, emulsified organic liquids and colloidal or suspended solids, usually from water. Typical applications are (i) in a membrane bioreactor, to produce permeate as purified water and recycle biomass; for (ii) tertiary filtration of wastewater to remove suspended solids and pathogenic bacteria; (iii) clarification of aqueous streams including filtration of surface water to produce drinking water (removal of colloids, long chain carboxylic acids and pathogens); (iv) separation of a permeable liquid component in biotechnology broths; (v) de-watering of metal hydroxide sludges; and, (vi) filtration of oily wastewater, inter alia.

The problem with using a conventional membrane module to selectively separate one fluid from another, particularly using the module in combination with a bioreactor, and the attendant costs of operating such a system, have been avoided. In those instances where an under-developed country or distressed community lacks the resources to provide membrane modules, the most preferred embodiment of this invention is adapted for use without any pumps. In those instances where a pump is conveniently used, a vacuum pump is unnecessary, adequate driving force being provided by a simple centrifugal pump incapable of inducing a vacuum of 75 cm Hg on the suction side.

The fibers used to form the skein may be formed of any conventional membrane material provided the fibers are flexible and have an average pore cross sectional diameter for microfiltration, namely in the range from about 1000 Å to 10000 Å Preferred fibers operate with a transmembrane pressure differential in the range from 7 kPa (1 psi)-69 kPa (10 psi) and are used under ambient pressure with the permeate withdrawn under gravity. The fibers are chosen with a view to perform their desired function, and the dimensions of the skein are determined by the geometry of the headers and length of the fibers. It is unnecessary to confine a skein in a modular shell, and a skein is not.

Preferred fibers are made of organic polymers and ceramics, whether isotropic, or anisotropic, with a thin layer or "skin" on the outside surface of the fibers. Some fibers may be made from braided cotton covered with a porous natural rubber latex or a water-insoluble cellulosic polymeric material. Preferred organic polymers for fibers are polysulfones, poly(styrenes), including styrene-containing copolymers such as acrylonitrile-styrene, butadiene-styrene and styrene-vinylbenzylhalide copolymers, polycarbonates, cellulosic polymers, polypropylene, poly(vinyl chloride), poly(ethylene terephthalate), and the like disclosed in U.S. Pat. No. 4,230,463 the disclosure of which is incorporated by reference thereto as if fully set forth herein. Preferred ceramic fibers are made from alumina, by E. I. duPont deNemours Co. and disclosed in U.S. Pat. No. 4,069,157.

Typically, there is no cross flow of substrate across the surface of the fibers in a "dead end" tank. If there is any flow of substrate through the skein in a dead end tank, the flow is due to aeration provided beneath the skein, or to such mechanical mixing as may be employed to maintain the solids in suspension. There is more flow through the skein in a tank into which substrate is being continuously flowed, but the velocity of fluid across the fibers is generally too insignificant to deter growing microorganisms from attaching themselves, or suspended particles, e.g. microscopic siliceous particles, from being deposited on the surfaces of the fibers.

For hollow fiber membranes, the outside diameter of a fiber is at least 20 μm and may be as large as about 3 mm, typically being in the range from about 0.1 mm to 2 mm. The larger the outside diameter the less desirable the ratio of surface area per unit volume of fiber. The wall thickness of a fiber is at least 51 m and may be as much as 1.2 mm, typically being in the range from about 15% to about 60% of the outside diameter of the fiber, most preferably from 0.5 mm to 1.2 mm.

As in a '424 array, but unlike in a conventional module, the length of a fiber in a skein is essentially independent of the strength of the fiber, or its diameter, because the skein is buoyed both by bubbles and the substrate in which it is deployed. The length of fibers in the skein is preferably determined by the conditions under which the skein is to operate. Typically fibers range from 1 m to about 5 m long, depending upon the dimensions of the body of substrate (depth and width) in which the skein is deployed.

The fixing material to fix the fibers in a finished header is most preferably either a thermosetting or thermoplastic synthetic resinous material, optionally reinforced with glass fibers, boron or graphite fibers and the like. Thermoplastic materials may be crystalline, such as polyolefins, polyamides (nylon), polycarbonates and the like, semi-crystalline such as polyetherether ketone (PEEK), or substantially amorphous, such as poly(vinyl chloride) (PVC), polyurethane and the like. Thermosetting resins commonly include polyesters, polyacetals, polyethers, cast acrylates, thermosetting polyurethanes and epoxy resins. Most preferred as a "fixing" material (so termed because it fixes the locations of the fibers relative to each other) is one which when cured is substantially rigid in a thickness of about 2 cm, and referred to generically as a "plastic" because of its hardness. Such a plastic has a hardness in the range from about Shore D 50 to Rockwell R 110 and is selected from the group consisting of epoxy resins, phenolics, acrylics, polycarbonate, nylon, polystyrene, polypropylene and ultra-high molecular weight polyethylene (UHMW PE). Polyurethane such as is commercially available under the brand names Adiprene.RTM. from Uniroyal Chemical Company and Airthane.RTM. from Air Products, and commercially available epoxy resins such as Epon 828 are excellent fixing materials.

The number of fibers in an array is arbitrary, typically being in the range from about 1000 to about 10000 for commercial applications, and the preferred surface area for a skein is in the range from 10 m$^2$ to 100 m$^2$.

The particular method of securing the fibers in each of the headers is not narrowly critical, the choice depending upon the materials of the header and the fiber, and the cost of using a method other than potting. However, it is essential that each of the fibers be secured in fluid-tight relationship within each header to avoid contamination of permeate. This is effected by potting the fibers essentially vertically, in closely-spaced relationship, either linearly in plural equally spaced apart rows across the face of a header in the x-y plane; or alternatively, randomly, in non-linear plural rows. In the latter, the fibers are displaced relative to one another in the lateral direction.

FIG. 1 presents the results of a comparison of three runs made, one using the teachings of Yamamoto in his '89 publication (curve 2), but using an aerator which introduced air from the side and directed it radially inwards, as is shown in Chiemchaisri et al. A second run (curve 1) uses the gas-scrubbed assembly of the '424 patent, and the third run (curve 3) uses the gas-scrubbed skein of this invention. The specific flux obtained with an assembly of an inverted parabolic array with an air distributor means (Yarnamoto et al), as disclosed in Wat. Sci. Tech. Vol. 21, Brighton pp 43-54, 1989, and, the parabolic array by Cote et al in the '424 patent, are compared to the specific flux obtained with the vertical skein of this invention.

The comparison is for the three assemblies having fibers with nominal pore size 0.2 μm with essentially identical bores and surface area in 80 L tanks filled with the same activated sludge substrate. The differences between the stated experiment of Yamamoto et al, and that of the '424 patent are of record in the '424 patent, and the conditions of the comparison are incorporated by reference thereto as if fully set forth herein. The vertical skein used herein differs from the '424 skein only in the vertical configuration of the 280 fibers each of which was about 1% longer than the distance between the spaced apart headers during operation. The flow rate of air for the vertical skein is 1.4 $m^3/hr/m^2$ using a coarse bubble diffuser.

It will be evident from FIG. 1 in which the specific flux, liters/meter2 hr/kPa (conventionally written as (1 mh/kPa), is plotted as a function of operating time for the three assemblies, that the curve, identified as reference numeral 3 for the flux for the vertical skein, provides about the same specific flux as the parabolic skein, identified as reference numeral 1. As can be seen, each specific flux reaches an equilibrium condition within less than 50 hr, but after about 250 hr, it is seen that the specific flux for the inverted parabolic array keeps declining but the other two assemblies reach an equilibrium.

Figure 2:
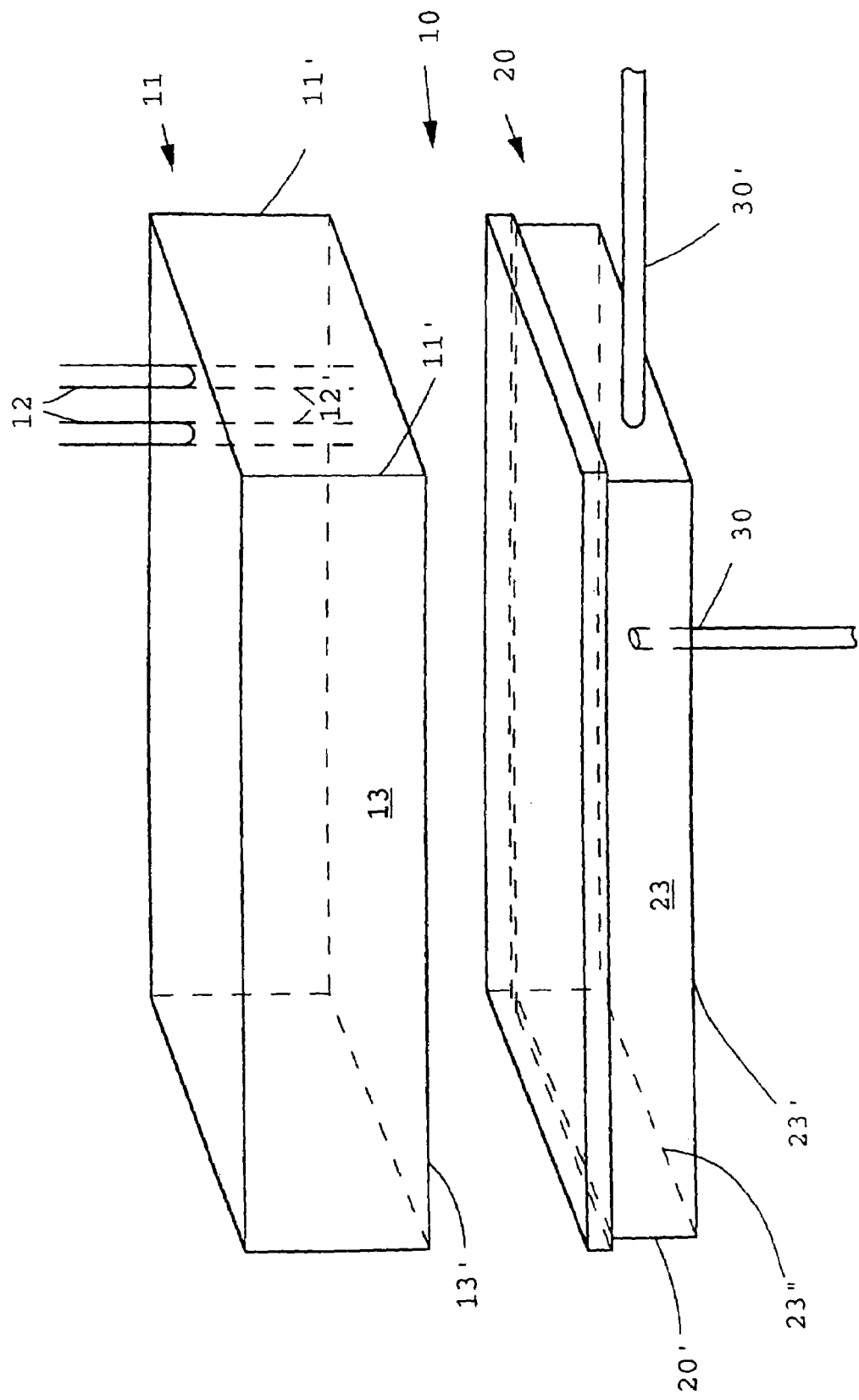
FIG. 2 is a perspective exploded view schematically illustrating a membrane device comprising a skein of fibers, unsupported during operation of the device, with the ends of the fibers potted in a lower header, along with a permeate collection pan, and a permeate withdrawal conduit. By "unsupported" is meant not supported except for spacer means to space the headers'.

Referring to FIG. 2 there is illustrated, in exploded view a portion of a membrane device referred to as a "vertical skein" 10, comprising a lower header 11 of a pair of headers, the other upper header (not shown) being substantially identical; a collection pan 20 to collect the permeate; and, a permeate withdrawal conduit 30. The header shown is a rectangular prism since this is the most convenient shape to make, if one is going to pot fibers 12 in a potting resin such as a polyurethane or an epoxy. Though the fibers 12 are not shown as close together as they would normally be, it is essential that the fibers are not in contact with each other but that they be spaced apart by the cured resin between them.

As illustrated, the open ends of the terminal portion 12' of the fibers are in the same plane as the lower face of the header 11 because the fibers are conventionally potted and the header sectioned to expose the open ends. A specific potting procedure in which the trough of a U-shaped bundle of fibers is potted, results in forming two headers. This procedure is described in the '424 patent (col 17, lines 44-61); however, even cutting the potted fibers with a thin, high-speed diamond blade, tends to damage the fibers and initiate the collapse of the circumferential wall. In another conventional method of potting fibers, described in U.S. Pat. No. 5,202,023, bundled fibers have their ends dipped in resin or paint to prevent potting resin penetration into the bores of the fibers during the potting process. The ends of the bundle are then placed in molds and uncured resin added to saturate the ends of the fiber bundle and fill the spaces between the individual fibers in the bundle and the flexible tubing in which the bundle is held. The cured molded ends are removed from the molds and the molded ends cut off (see, bridging cols 11 and 12). In each art method, sectioning the mold damages the embedded fibers.

Therefore a novel method is used to form a header 11 in the form of a rectangular prism. The method requires forming a composite header with two liquids. A first liquid fugitive material, when solidified (cured), forms a "fugitive lamina" of the composite header; a second liquid of non-fugitive fixing material forms a "fixing lamina". By a "fugitive material" we refer to a material which is either (i) soluble in a medium in which the fibers and fixing material are not soluble, or (ii) fluidizable by virtue of having a melting point (if the material is crystalline) below that which might damage the fibers or fixing material; or, the material has a glass transition temperature Tg (if the material is non-crystalline), below that which might damage the fibers or material(s) forming the non-fugitive header; or (iii) both soluble and fluidizable.

The first liquid is poured around terminal portions of fibers, allowed to cool and solidify into a fugitive lamina; the fibers in the fugitive lamina are then again potted, this time by pouring the second liquid over the solid fugitive lamina.

In greater detail, the method for forming a finished header for skein fibers comprises, forming a stack of at least two superimposed essentially coplanar and similar arrays, each array comprising a chosen number of fibers supported on a support means having a thickness corresponding to a desired lateral spacing between adjacent arrays;

holding the stack in a first liquid with terminal portions of the fibers submerged, until the liquid solidifies into a first shaped lamina, provided that the first liquid is unreactive with material of the fibers;

pouring a second liquid over the first shaped lamina to embed the fibers to a desired depth, and solidifying the second liquid to form a fixing lamina upon the first shaped lamina, the second liquid also being substantially unreactive with either the material of the fibers or that of the first shaped lamina;

whereby a composite header is formed in which terminal portions of the fibers are potted, preferably in a geometrically regular pattern, the composite header comprising a laminate of a fugitive lamina of fugitive material and a contiguous finished header of fixing lamina; and thereafter, removing the first shaped lamina without removing a portion of the fixing lamina so as to leave the ends of the fibers open and protruding from the aft face of the header, the open ends having circular cross-section.

Figure 3:
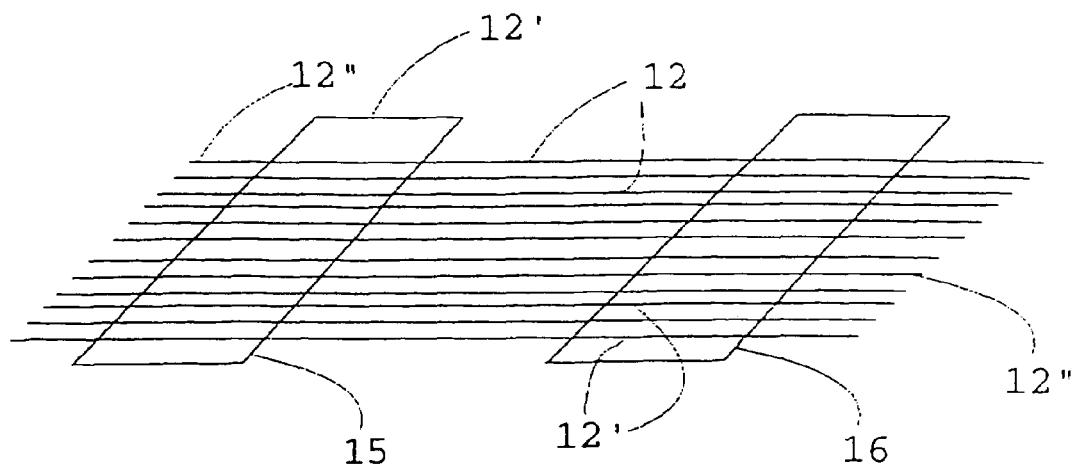
FIG. 3 is a perspective view of a single array, schematically illustrated, of a row of substantially coplanarly disposed parallel fibers secured near their opposed terminal ends between spaced apart cards. Typically, multiple arrays are assembled before being sequentially potted

The step-wise procedure for forming an array "A" with the novel header is described with respect to an array illustrated in FIG. 3, as follows:

A desired number of fibers 12 are each cut to about the same length with a sharp blade so as to leave both opposed ends of each fiber with an essentially circular cross-section. The fibers are coplanarly disposed side-by-side in a linear array on a planar support means such as strips or cards 15 and 16. Preferably the strips are coated with an adhesive, e.g. a commercially available polyethylene hot-melt adhesive, so that the fibers are glued to the strips and opposed terminal portions 12" respectively of the fibers, extend beyond the strips. Intermediate portions 12' of the fibers are thus secured on the strips. Alternatively, the strips may be grooved with parallel spaced-apart grooves which snugly accommodate the fibers. The strips may be flexible or rigid. If flexible, strips with fibers adhered thereto, are in turn, also adhered to each other successively so as to form a progressively stiffer stack for a header having a desired geometry of potted fibers. To avoid gluing the strips, a regular pattern of linear rows may be obtained by securing multiple arrays on rigid strips in a stack, with rubber bands 18 or other clamping means. The terminal portions 12" are thus held in spaced-apart relationship, with the center to center distance of adjacent fibers preferably in the range from 1.2 (1.2d) to about 5 times (5d) the outside diameter 'd' of a fiber. Spacing the fibers further apart wastes space and spacing them closer increases the risk of fiber-to-fiber contact near the terminal end portions when the ends are potted. Preferred center-to-center spacing is from about 1.5d to 2d. The thickness of a strip and/or adhesive is sufficient to ensure that the fibers are kept spaced apart. Preferably, the thickness is about the same as, or relatively smaller than the outside diameter of a fiber, preferably from about 0.5d to 1d thick, which becomes the spacing between adjacent outside surfaces of fibers in successive linear arrays.

Having formed a first array, a second array (not shown because it would appear essentially identical to the first) is prepared in a manner analogous to the first, strip 15 of the second array is overlaid upon the intermediate portions 12' on strip 15 of the first array, the strip 15 of the second array resting on the upper surfaces of the fibers secured in strip 15 of the first array. Similarly, strip 16 of the second array is overlaid upon the intermediate portions 12' on scrip 16 of the first array.

A third array (essentially identical to the first and second) is prepared in a manner analogous to the first, and then overlaid upon the second, with the strips of the third array resting on the upper surfaces of the fibers of the second array.

Additional arrays are overlaid until the desired number of arrays are stacked in rows forming a stack of arrays with the adhesive-coated strips forming the spacing means between successive rows of fibers. The stack of arrays on strips is then held vertically to present the lower portion of the stack to be potted first.

Figure 4:
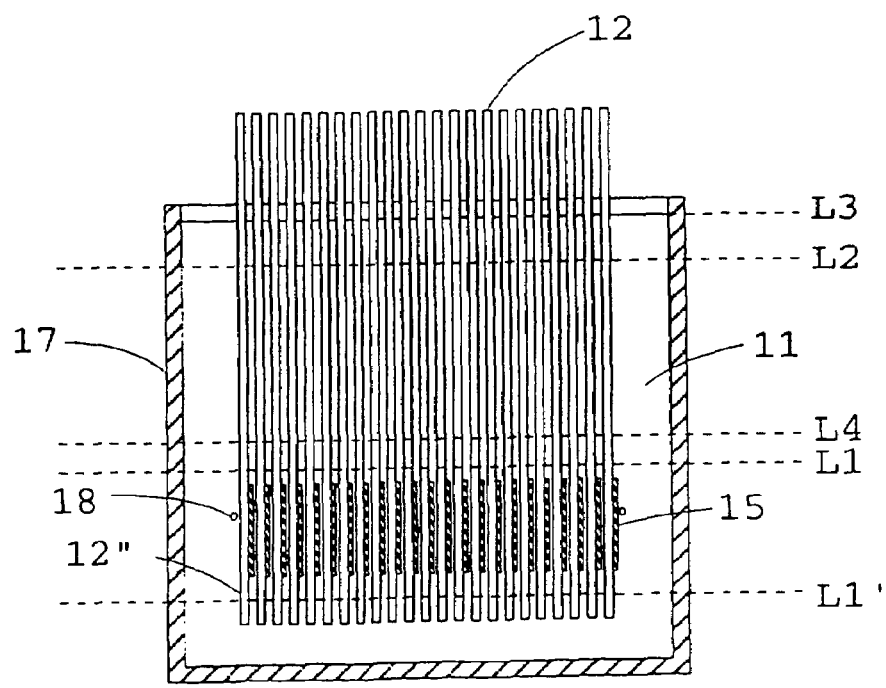
FIG. 4 illustrates a side elevational view of a stack of arrays near one end where it is together, showing that the individual fibers (only the last fiber of each linear array is visible, the remaining fibers in the array being directly behind the last fiber) of each array are separated by the thickness of a strip with adhesive on it, as the stack is held vertically in potting liquid.

Referring to FIG. 4, there is schematically illustrated a rectangular potting pan 17 the length and width dimensions of which correspond substantially to the longitudinal (x-axis) and transverse (y-axis) dimensions respectively, of the desired header. The lower stack is submerged in a first liquid which rises to a level indicated by L1, in the pan 17. Most preferred is a liquid wax, preferably a water-soluble wax having a melting point lower than 75° C., such as a polyethylene glycol (PEG) wax.

The depth to which the first liquid is poured will depend upon whether the strips 15 are to be removed from, or left in the finished header.

A First illustrated is the potting of skein fibers in upper and lower headers from which the strips will be removed.

(1) A first shaped lamina having a thickness L1 (corresponding to the depth to which the first liquid was poured) is formed to provide a fugitive lamina from about 5-10 cm thick. The depth of the first liquid is sufficient to ensure that both the intermediate portions 12' on the strips and terminal portions 12" will be held spaced apart when the first liquid solidifies and plugs all the fibers.

(2) The second liquid, a curable, water-insoluble liquid potting resin, or reactive components thereof, is poured over the surface of the fugitive lamina to surround the fibers, until the second liquid rises to a level L2. It is solidified to form the fixing lamina (which will be the finished header) having a thickness measured from the level L1 to the level L2 (the thickness is written "L1-2"). The thickness L1-L2 of the fixing lamina, typically from about 1 cm to about 5 cm, is sufficient to maintain the relative positions of the vertical fibers. A first composite header is thus formed having the combined thicknesses of the fugitive and fixing laminae.

(3) In a manner analogous to that described immediately hereinabove, a stack is potted in a second composite header.

(4) The composite headers are demolded from their potting pans and hot air blown over them to melt the fugitive laminae, leaving only the finished headers, each having a thickness L1-L2. The fugitive material such as the PEG wax, is then reused. Alternatively, a water-soluble fugitive material may be placed in hot water to dissolve the wax, and the material recovered from its water solution.

(5) The adhered strips and terminal portions of the fibers which were embedded within the fugitive lamina are left protruding from the permeate-discharging aft faces of the headers with the ends of the fibers being not only open, but essentially circular in cross section. The fibers may now be cut above the strips to discard them and the terminal portions of the fibers adhered to them, yet maintaining the circular open ends. The packing density of fibers, that is, the number of fibers per unit area of header preferably ranges from 4 to 50 fibers/cm$^2$ depending upon the diameters of the fibers.

B. Illustrated second is the potting of skein fibers in upper and lower headers from which the strips will not be removed, to avoid the step of cutting the fibers.

(1) The first liquid is poured to a level L1' below the cards, to a depth in the range from about 1-2.5 cm, and solidified, forming fugitive lamina L1'.

(2) The second liquid is then poured over the fugitive lamina to depth L2 and solidified, forming a composite header with a fixing lamina having a thickness L1'-L2.

(3) The composite header is demolded and the fugitive lamina removed, leaving the terminal portions 12" protruding from the aft face of the finished header, which aft face is formed at what had been the level L1'. The finished header having a thickness L1'-L2 embeds the strips 15 (along with the rubber bands 18, if used).

C. Illustrated third is the potting of skein fibers to form a finished headers with a cushioning lamina embedding the fibers on the opposed (fore) faces of the headers from which the strips will be removed.

The restricted swayability of the fibers generates some intermittent 'snapping' motion of the fibers. This motion has been found to break the potted fibers around their circumferences, at the interface of the fore face and substrate. The hardness of the fixing material which forms a "fixing lamina" was found to initiate excessive shearing forces at the circumference of the fiber. The deleterious effects of such forces is minimized by providing a cushioning lamina of material softer than the fixing lamina. Such a cushioning lamina is formed integrally with the fixing lamina, by pouring cushioning liquid (so termed for its function when cured) over the fixing lamina to a depth L3 as shown in FIG. 4, which depth is sufficient to provide enough 'give' around the circumferences of the fibers to minimize the risk of shearing. Such cushioning liquid, when cured is rubbery, having a hardness in the range from about Shore A 30 to Shore D 45, and is preferably a polyurethane or silicone or other rubbery material which will adhere to the fixing lamina. Upon removal of the fugitive lamina, the finished header thus formed has the combined thicknesses of the fixing lamina and the cushioning lamina, namely L1-L3 when the strips 15 are cut away;

D. Illustrated fourth is the formation a finished header with a gasketing lamina embedding the fibers on the header's aft face, and a cushioning lamina embedding the fibers on the header's fore face; the strips are to be removed.

Whichever finished header is made, it is preferably fitted into a permeate pan 20 as illustrated in FIG. 2 with a peripheral gasket. It has been found that it is easier to seal the pan against a gasketing lamina, than against a peripheral narrow gasket. A relatively soft gasketing material having a hardness in the range from Shore A 40 to Shore D 45, is desirable to form a gasketing lamina a integrally with the aft face of the finished header. In the embodiment in which the strips are cut away, the fugitive lamina is formed as before, and a gasketing liquid (so termed because it forms the gasket when cured) is poured over the surface of the fugitive lamina to a depth L4. The gasketing liquid is then cured. Upon removal of the fugitive lamina, when the strips 15 are cut away, the finished header thus formed has the combined thicknesses of the gasketing lamina (L1-L4), the fixing lamina (L4-L2) and the cushioning lamina (L2-L3), namely an overall L1-L3.

Figure 5:
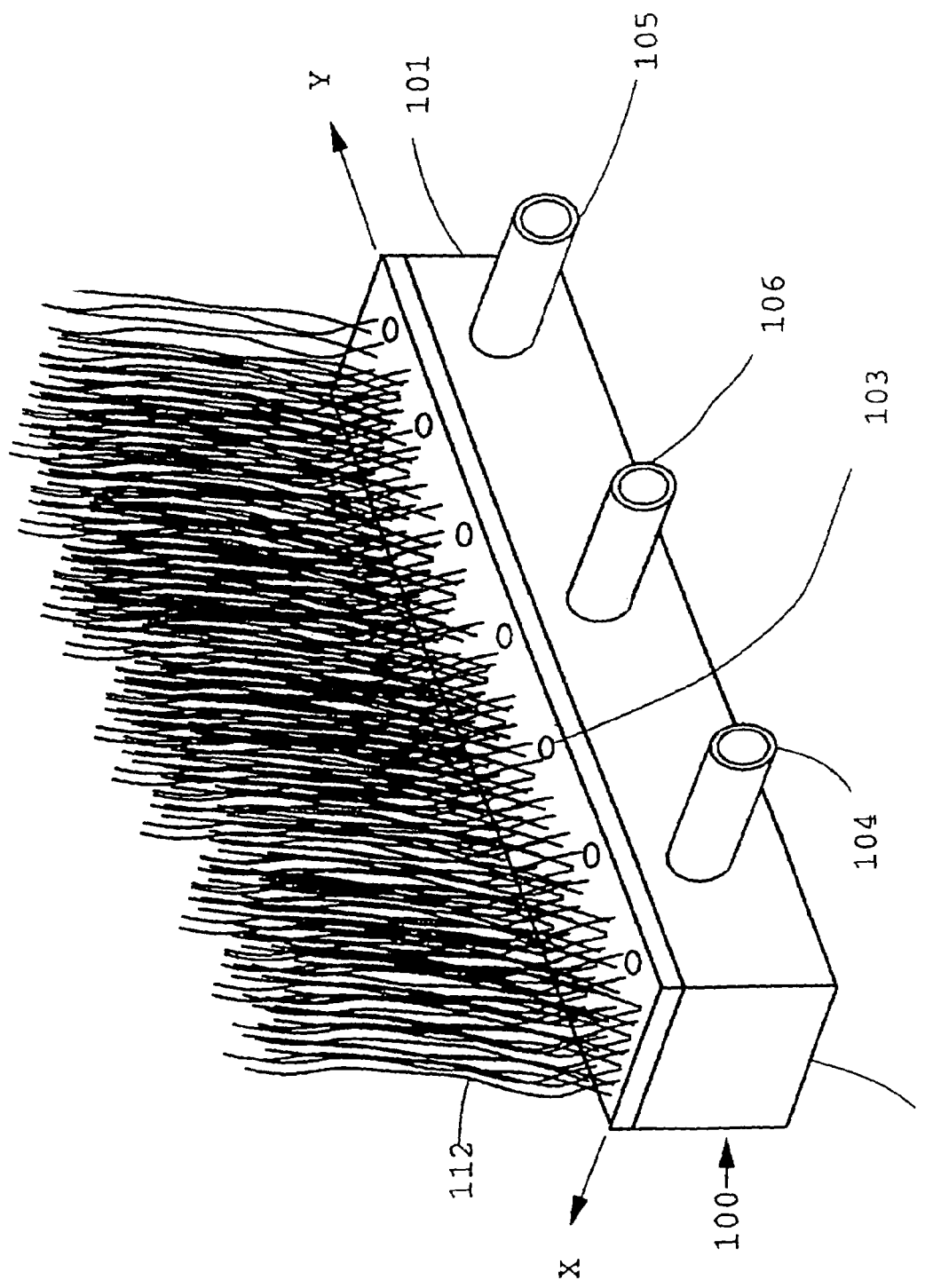
FIG. 5 is a perspective view schematically illustrating a skein with its integral finished header, its permeate collection pan, and twin air-tubes feeding an integral air distribution manifold potted in the header along an outer edge of the skein fibers.

In another embodiment, to avoid securing the pan to the header with a gasketing means, and, to avoid positioning one or more gas-distribution manifolds in an optimum location near the base of the skein fibers after a skein is made, the manifolds are formed integrally with a header. Referring to FIG. 5 there is illustrated in perspective view an "integral single skein" referred to generally by reference numeral 100. The integral single skein is so termed because it includes an integral finished header 101 and permeate pan 102. The pan 102 is provided with a permeate withdrawal nipple 106, and fitted with vertical air-tubes 103 which are to be embedded in the finished header. The air-tubes are preferably manifolded on either side of the skein fibers, to feeder air-tubes 104 and 105 which are snugly inserted through grommets in the walls of the pan. The permeate nipple 106 is then plugged, and a stack of arrays is held vertically in the pan in which a fugitive lamina is formed embedding both the ends of the fibers and the lower portion of the vertical air-tubes 103. A fixing lamina is then formed over the fugitive lamina, embedding the fibers to form a fixing lamina through which protrude the open ends of the air-tubes 103. The fugitive lamina is then melted and withdrawn through the nipple 106. In operation, permeate collects in the permeate pan and is withdrawn through nipple 106.

Figure 6:
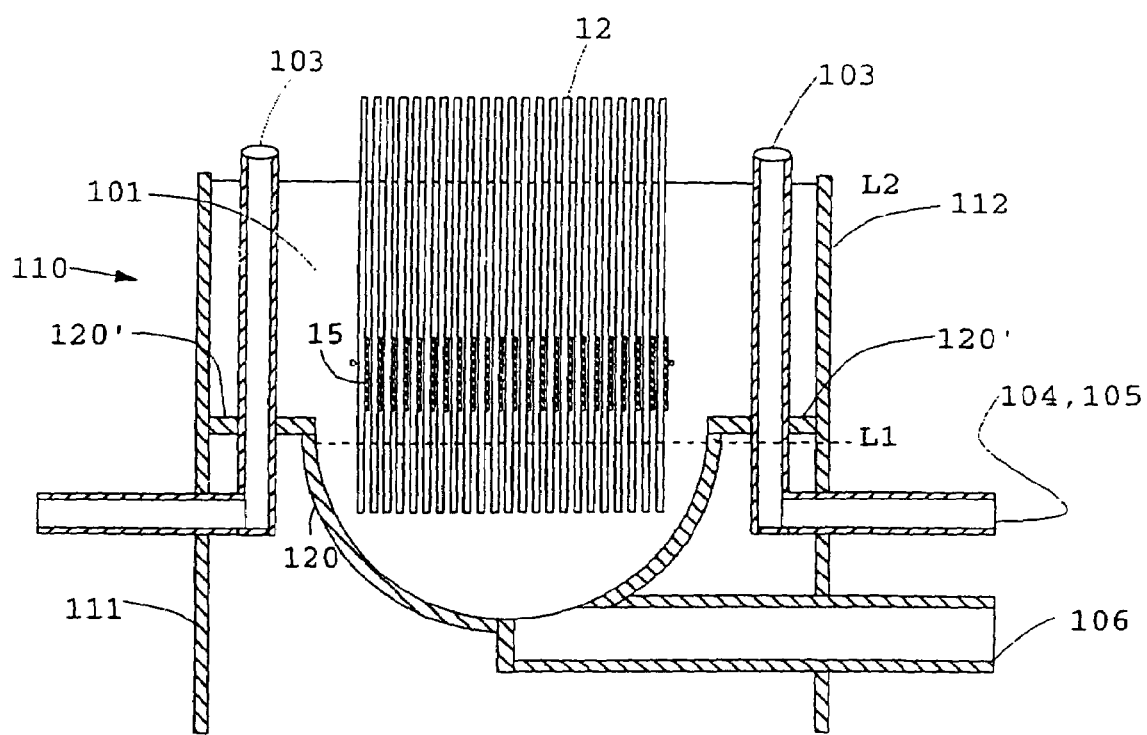
FIG. 6 is a side elevational view of an integral finished header showing details of a permeate pan submerged in substrate, the walls of the header resting on the bottom of a reservoir, and multiple air-tubes feeding integral air distribution manifolds potted in the header along each outer edge of the skein fibers.

FIG. 6 illustrates a cross-section of an integral single skein 110 with another integral finished header 101 having a thickness L1-L2, but without a cushioning lamina, formed in a procedure similar to that described hereinabove. A permeate pan 120 with outwardly flared sides 120' and transversely spaced-apart through-apertures therein, is prefabricated between side walls 111 and 112 so the pan is spaced above the bottom of the reservoir.

Figure 7A:
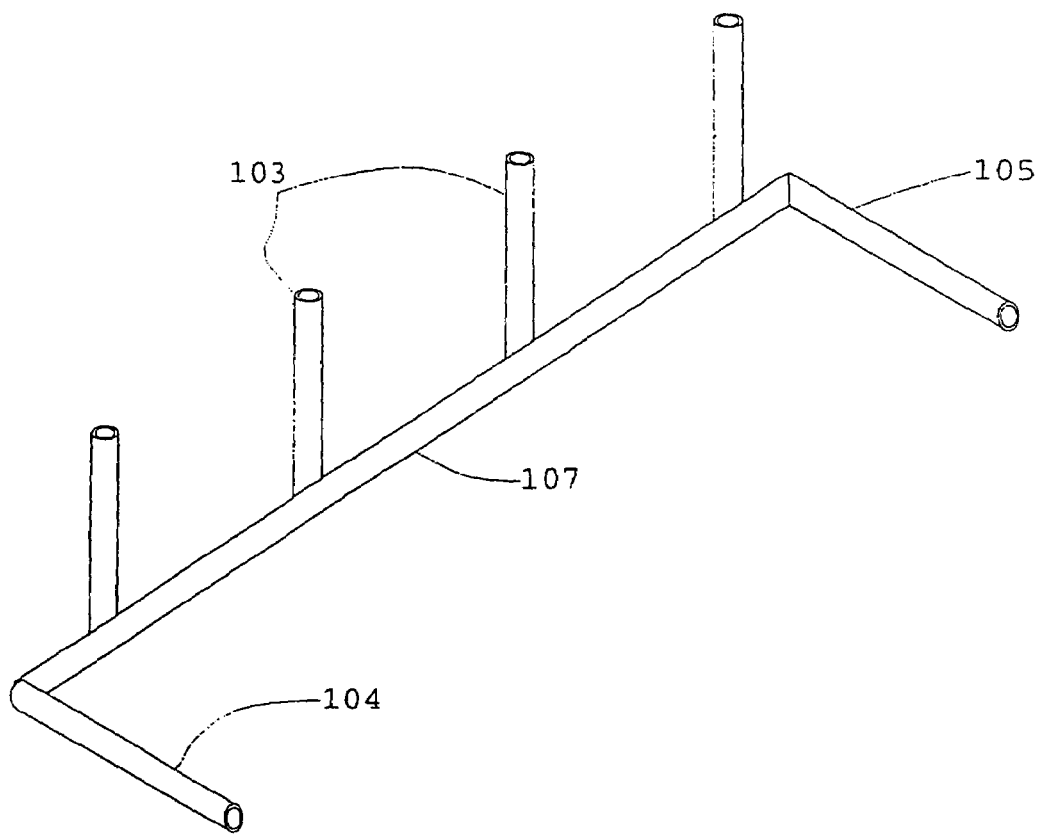
FIG. 7A is a perspective view schematically illustrating an air-manifold from which vertical air-tubes rise.
Figure 7B:
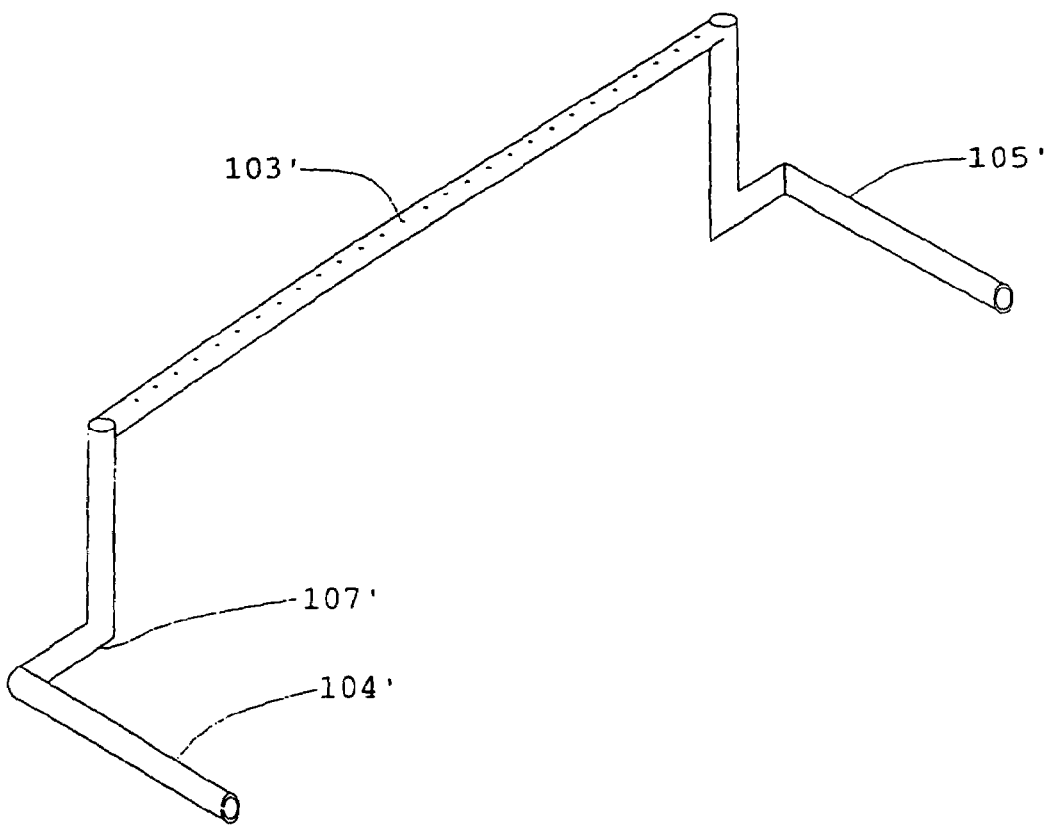
FIG. 7B is a perspective view schematically illustrating a tubular air-manifold having a transverse perforated portion, positioned by opposed terminal portions.

A pair of air-manifolds 107 such as shown in FIG. 7A or 7B, is positioned and held in mirror-image relationship with each other adjacent the permeate pan 120, with the vertical air-tubes 103 protruding through the apertures in sides 120', and the ends 104 and 105 protrude from through-passages n the vertical walls on either side of the permeate pan. Permeate withdrawal nipple 106 (FIG. 6) is first temporarily plugged. The stack of strips 15 is positioned between air-tubes 103, vertically in the pan 120 which is filled to level L1 to form a fugitive lamina, the level being just beneath the lower edges of the strips 15 which will not be removed. When solidified, the fugitive lamina embeds the terminal portions of the fibers 12 and also fills permeate tube 106. Then the second liquid is poured over the upper surface of the fugitive lamina until the liquid covers the strips 15 but leaves the upper ends of the air-tubes 103 open. The second liquid is then cured to form the fixing lamina of the composite header which is then heated to remove the fugitive material through the permeate nozzle 106 after it is unplugged.

FIG. 7A schematically shows in perspective view, an air-manifold 107 having vertical air-tubes 103 rising from a transverse header-tube which has longitudinally projecting feeder air-tubes 104 and 105. The bore of the air-tubes which may be either "fine bubble diffusers", or "coarse bubble diffusers", or "aerators", is chosen to provide bubbles of the desired diameter under operating conditions, the bore typically being in the range from 0.1 mm to 5 mm. Bubbles of smaller diameter are preferably provided with a perforated transverse tube 103' of an air-manifold 107' having feeder air-tubes 104' and 105', illustrated in FIG. 7B. In each case, the bubbles function as a mechanical brush.

The skein fibers for the upper header of the skein are potted in a manner analogous to that described above in a similar permeate pan to form a finished header, except that no air manifolds are inserted.

Figure 8:
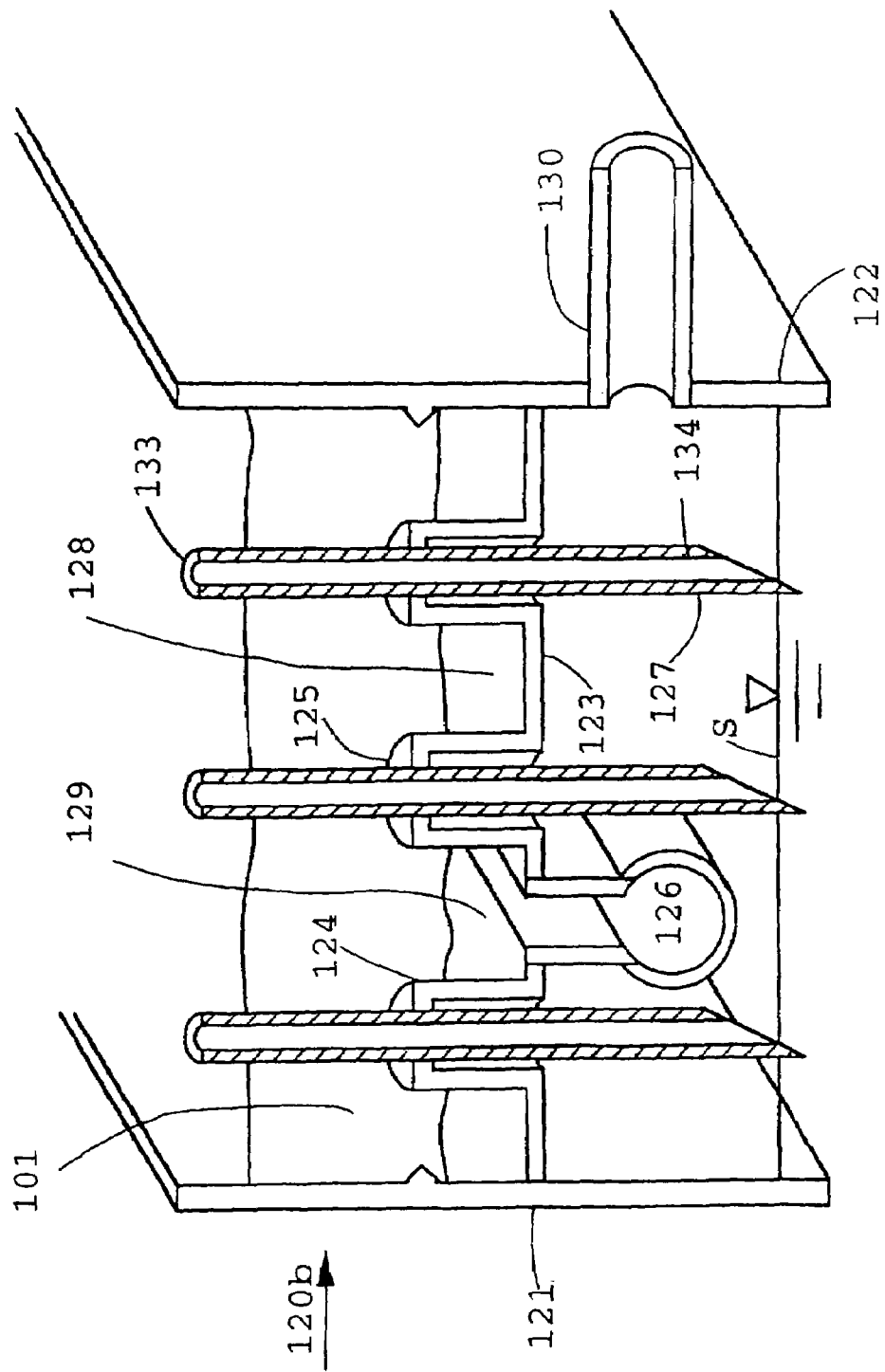
FIG. 8 is a perspective view of an integral finished header having plural skeins potted in a common header molded in an integral permeate collection means with air-tubes rising vertically through the header between adjacent skeins, and along the outer peripheries of the outer skeins.

Referring to FIG. 8 there is schematically illustrated, in a cross-sectional perspective view, an embodiment in which a bank of two skeins is potted in a single integral finished header enclosure, referred to generally by reference numeral 120b. The term "header enclosure" is used because its side walls 121 and 122, and end walls (not shown) enclose a plenum in which air is introduced. Instead of a permeate pan, permeate is collected from a permeate manifold which serves both skeins. Another similar upper enclosure 120u (not shown), except that it is a flat-bottomed channel-shaped pan (inverted for use as the upper header) with no air-tubes molded in it, has the opposed terminal portions of all the skein fibers potted in the pan. For operation, both the lower and upper enclosures 120b and 120u, with their skein fibers are lowered into a reservoir of the substrate to be filtered. The side walls 121 and 122 need not rest on the bottom of the reservoir, but may be mounted on a side wall of the reservoir.

The side walls 121 and 122 and end walls are part of an integrally molded assembly having a platform 123 connecting the walls, and there are aligned multiple risers 124 molded into the platform. The risers resemble an inverted test-tube, the diameter of which need only be large enough to have an air-tube 127 inserted through the top 125 of the inverted test-tube. As illustrated, it is preferred to have "n+1" rows of air-tubes for "n"stacks of arrays to be potted. Crenelated platform 123 includes risers 124 between which lie channels 128 and 129. Channels 128 and 129 are each wide enough to accept a stack of arrays of fibers 12, and the risers are wide enough to have air-tubes 127 of sufficient length inserted therethrough so that the upper open ends 133 of the air-tubes protrude from the upper surface of the fixing material 101. The lower ends 134 of the air-tubes are sectioned at an angle to minimize plugging, and positioned above the surface S of the substrate. The channel 129 is formed so as to provide a permeate withdrawal tube 126 integrally formed with the platform 123. Side wall 122 is provided with an air-nipple 130 through which air is introduced into the plenum formed by the walls of the enclosure 120b, and the surface S of substrate under the platform 123. Each stack is potted as described in relation to FIG. 6 above, most preferably by forming a composite header of fugitive PEG wax and epoxy resin around the stacks of arrays positioned between the rows of risers 124, making sure the open ends of the air-tubes are above the epoxy fixing material, and melting out the wax through the permeate withdrawal tube 126. When air is introduced into the enclosure the air will be distributed through the air-tubes between and around the skeins.

Figure 9:
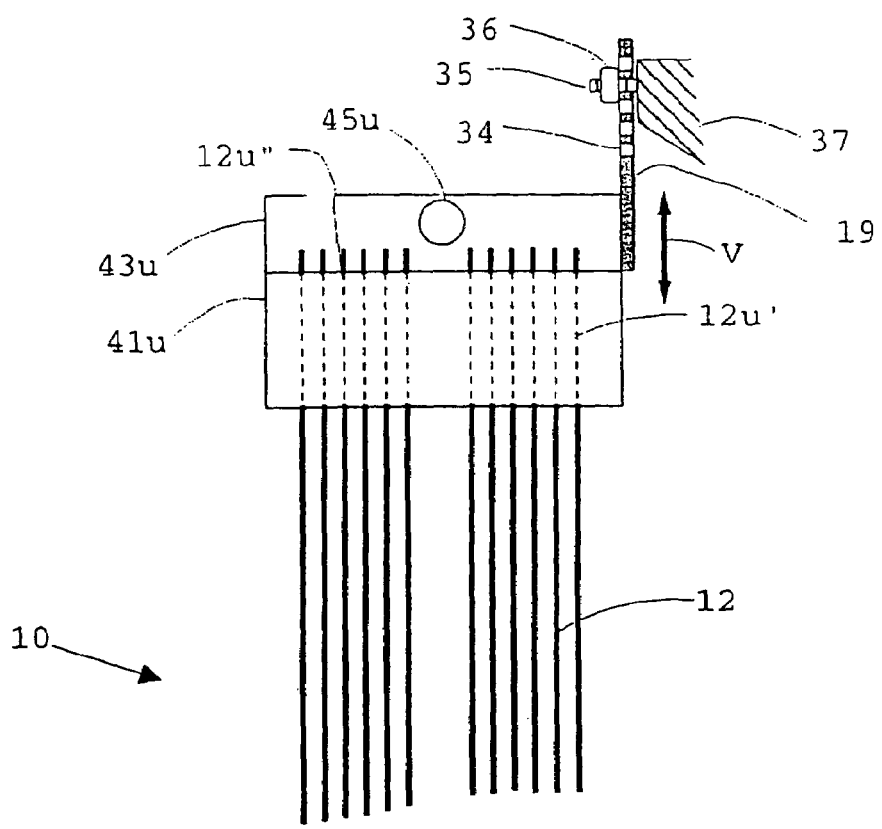
FIG. 9 is a detail, not to scale, illustratively showing a gas distribution means discharging gas between arrays in a header, and optionally along the sides of the lower header.
Figure 9:
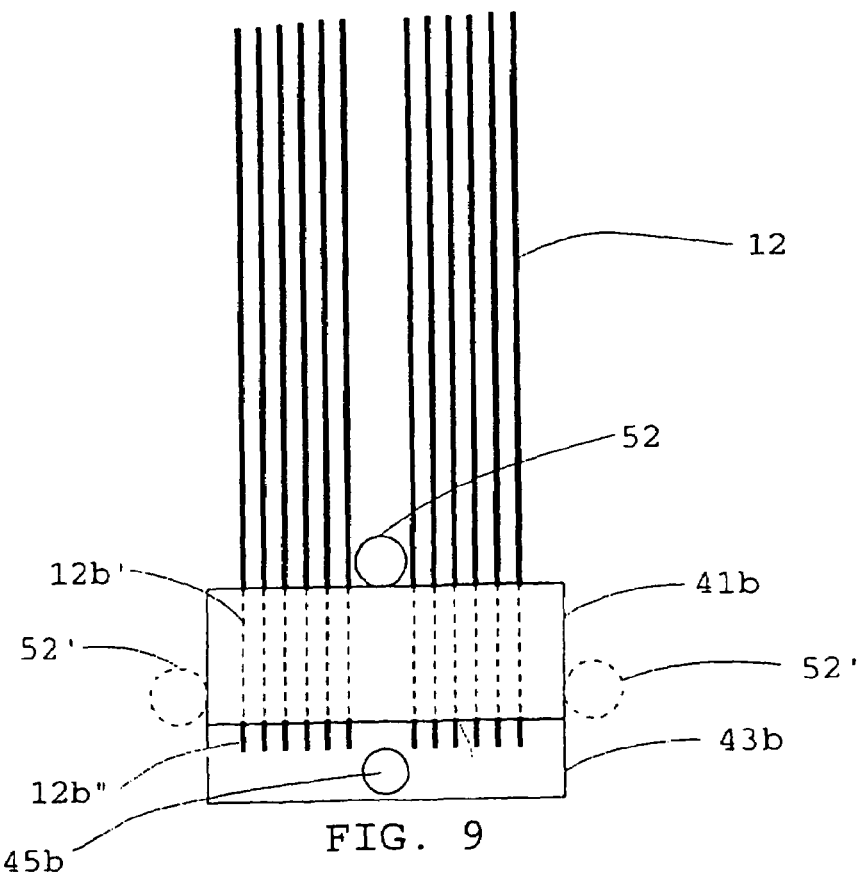

Referring to FIG. 9 there is shown a schematic illustration of a skein having upper and lower headers 41u and 41b respectively, and in each, the protruding upper and lower ends 12u" and 12b" are evidence that the face of the header was not cut to expose the fibers. The height of the contiguous intermediate portions 12u' and 12b' respectively, corresponds to the cured depth of the fixing material.

It will now be evident that the essential feature of the foregoing potting method is that a fugitive lamina is formed which embeds the openings of the terminal portions of the fibers before their contiguous intermediate portions 12u' and 12u" and 12b' and 12b" respectively are fixed in a fixing lamina of the header. An alternative choice of materials is the use of a fugitive potting compound which is soluble in a nonaqueous liquid in which the fixing material is not soluble. Still another choice is to use a water-insoluble fugitive material which is also insoluble in non-aqueous liquids typically used as solvents, but which fugitive material has a lower melting point than the final potting material which may or may not be water-soluble.

The fugitive material is inert relative to both, the material of the fibers as well as the final potting material to be cast, and the fugitive material and fixing material are mutually insoluble. Preferably the fugitive material forms a substantially smooth-surfaced solid, but it is critical that the fugitive material be at least partially cured, sufficiently to maintain the shape of the header, and remain a solid above a temperature at which the fixing material is introduced into the header mold. The fugitive lamina is essentially inert and insoluble in the final potting material, so that the fugitive lamina is removably adhered to the fixing lamina.

The demolded header is either heated or solvent extracted to remove the fugitive lamina. Typically, the fixing material is cured to a firm solid mass at a first curing temperature no higher than the melting point or Tg of the fugitive lamina, and preferably at a temperature lower than about 60° C.; the firm solid is then post-cured at a temperature high enough to melt the fugitive material but not high enough to adversely affect the curing of the fixing material or the properties of the fibers. The fugitive material is removed as described hereinafter, the method of removal depending upon the fugitive material and the curing temperature of the final potting material used.

Since, during operation, a high flux is normally maintained if cleansing air contacts substantially all the fibers, it will be evident that when it is desirable to have a skein having a cross-section which is other than generally rectangular, for example elliptical or circular, or having a geometrically irregular periphery, and it is desired to have a large number of skein fibers, it will be evident that the procedure for stacking consecutive peripheral arrays described above will be modified. Further, the transverse central air-tube 52 (see FIG. 9) is found to be less effective in skeins of non-rectangular cross-section than a vertical air-tube which discharges air radially along its vertical length and which vertical air-tube concurrently serves as the spacing means. Such skeins with a generally circular or elliptical cross-section with vertical air-tubes are less preferred to form a bank, but provide a more efficient use of available space in a reservoir than a rectangular skein.

Referring further to FIG. 2, the header 11 has front and rear walls defined by vertical (z-axis) edges 11' and longitudinal (x-axis) edges 13'; side walls defined by edges 11' and transverse (y-axis) edges 13"; and a base 13 defined by edges 13' and 13".

The collection pan 20 is sized to snugly accommodate the base 13 above a permeate collection zone within the pan. This is conveniently done by forming a rectangular pan having a base 23 of substantially the same length and width dimensions as the base 13. The periphery of the pan 20 is provided with a peripheral step as shown in FIG. 2A, in which the wall 20' of the pan terminates in a step section 22, having a substantially horizontal shoulder 22" and a vertical retaining wall 22'.

Figure 2B:
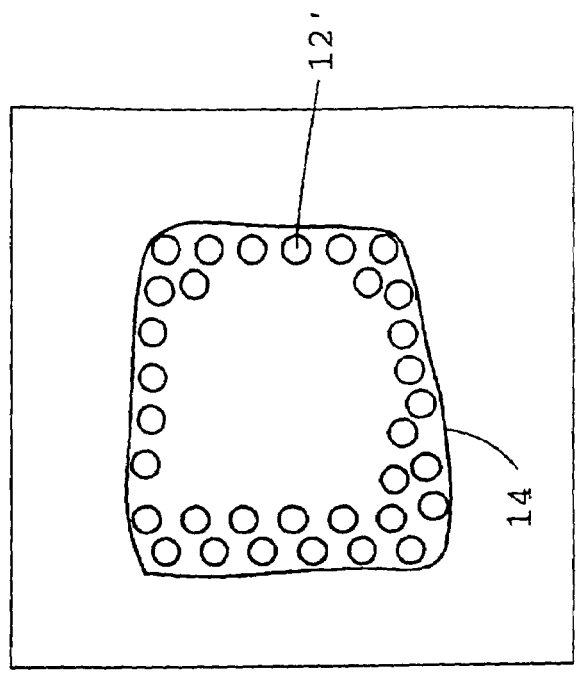
FIG. 2B is a bottom plan view of the header showing a random pattern of open ends protruding from the aft face of a header when fibers are potted after they are stacked in rows and glued together before being potted.
Figure 2A:
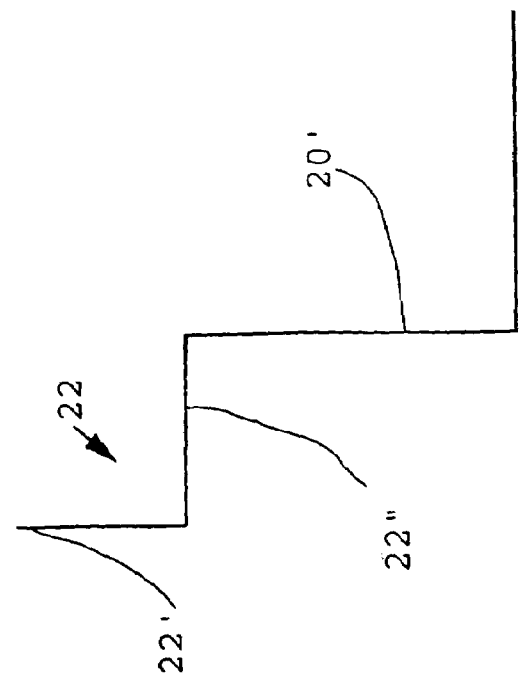
FIG. 2A is an enlarged detail side elevational view of a side wall of a collection pan showing the profile of a header-retaining step atop the periphery of the pan.

FIG. 2B is a bottom plan view of the lower face of header 13 showing the open ends of the fibers 12' prevented from touching each other by potting resin. The geometrical distribution of fibers provides a regular peripheral boundary 14 (shown in dotted outline) which bounds the peripheries of the open ends of the outermost fibers.

Permeate flows from the open ends of the fibers onto the base 23 of the pan 20, and flows out of the collection zone through a permeate withdrawal conduit 30 which may be placed in the bottom of the pan in open flow communication with the inner portion of the pan. When the skein is backwashed, backwashing fluid flows through the fibers and into the substrate. If desired, the withdrawal conduit may be positioned in the side of the pan as illustrated by conduit 30'. Whether operating under gravity alone, or with a pump to provide additional suction, it will be apparent that a fluid-tight seal is necessary between the periphery of the header 11 and the peripheral step 22 of the pan 20. Such a seal is obtained by using any conventional means such as a suitable sealing gasket or sealing compound, typically a polyurethane or silicone resin, between the lower periphery of the header 11 and the step 22. As illustrated in FIG. 2, permeate drains downward, but it could also be withdrawn from upper permeate port 45u in the upper permeate pan 43u (see FIG. 9).

It will now be evident that a header with a circular periphery may be constructed, if desired. Headers with geometries having still other peripheries (for example, an ellipse) may be constructed in an analogous manner, if desired, but rectangular headers are most preferred for ease of construction with multiple linear arrays.

Referring to FIGS. 9 and 2A, six rows of fibers 12 are shown on either side of a gas distribution line 52 which traverses the length of the rows along the base of the fibers. The potted terminal end portions 12b" open into permeate pan 43b. Because portions 12u' and 12b' of individual fibers 12 are potted, and the fibers 12 are preferably from 1% to 2% longer than the fixed distance between upper and lower headers 41u and 41b, the fibers between opposed headers are generally parallel to one another, but are particularly parallel near each header. Also held parallel are the terminal end portions 12u" and 12b" of the fibers which protrude from the headers with their open ends exposed. The fibers protrude below the lower face of the bottom header 41b, and above the upper face of the upper header 41u. The choice of fiber spacing in the header will determine packing density of the fibers near the headers, but fiber spacing is not a substantial consideration because spacing does not substantially affect specific flux during operation. It will be evident however, that the more fibers, the more tightly packed they will be, giving more surface area.

Since the length of fibers tends to change while in service, the extent of the change depending upon the particular composition of the fibers, and the spacing between the upper and lower headers is critical, it is desirable to mount the headers so that one is adjustable in the vertical direction relative to the other, as indicated by the arrow V. This is conveniently done by attaching the pan 43u to a plate 19 having vertically spaced apart through-passages 34 through which a threaded stud 35 is inserted and secured with a nut 36. Threaded stud 35 is in a fixed mounting block 37.

The density of fibers in a header is preferably chosen to provide the maximum membrane surface area per unit volume of substrate without adversely affecting the circulation of substrate through the skein. A gas-distribution means 52 such as a perforated air-tube, provides air within the skein so that bubbles of gas (air) rise upwards while clinging to the outer surfaces of the fibers, thus efficiently scrubbing them. If desired, additional air-tubes 52' may be placed on either side of the skein near the lower header 41b, as illustrated in phantom outline, to provide additional air-scrubbing power. Whether the permeate is withdrawn from the upper header through port 45u or the lower header through port 45b, or both, depends upon the particular application, but in all instances, the fibers have a substantially vertical orientation.

The vertical skein is deployed in a substrate to present a generally vertical profile, but has no structural shape. Such shape as it does have changes continuously, the degree of change depending upon the flexibility of the fibers, their lengths, the overall dimensions of the skein, and the degree of movement imparted to the fibers by the substrate and also by the oxygen-containing gas from the gas-distribution means.

Figure 10:
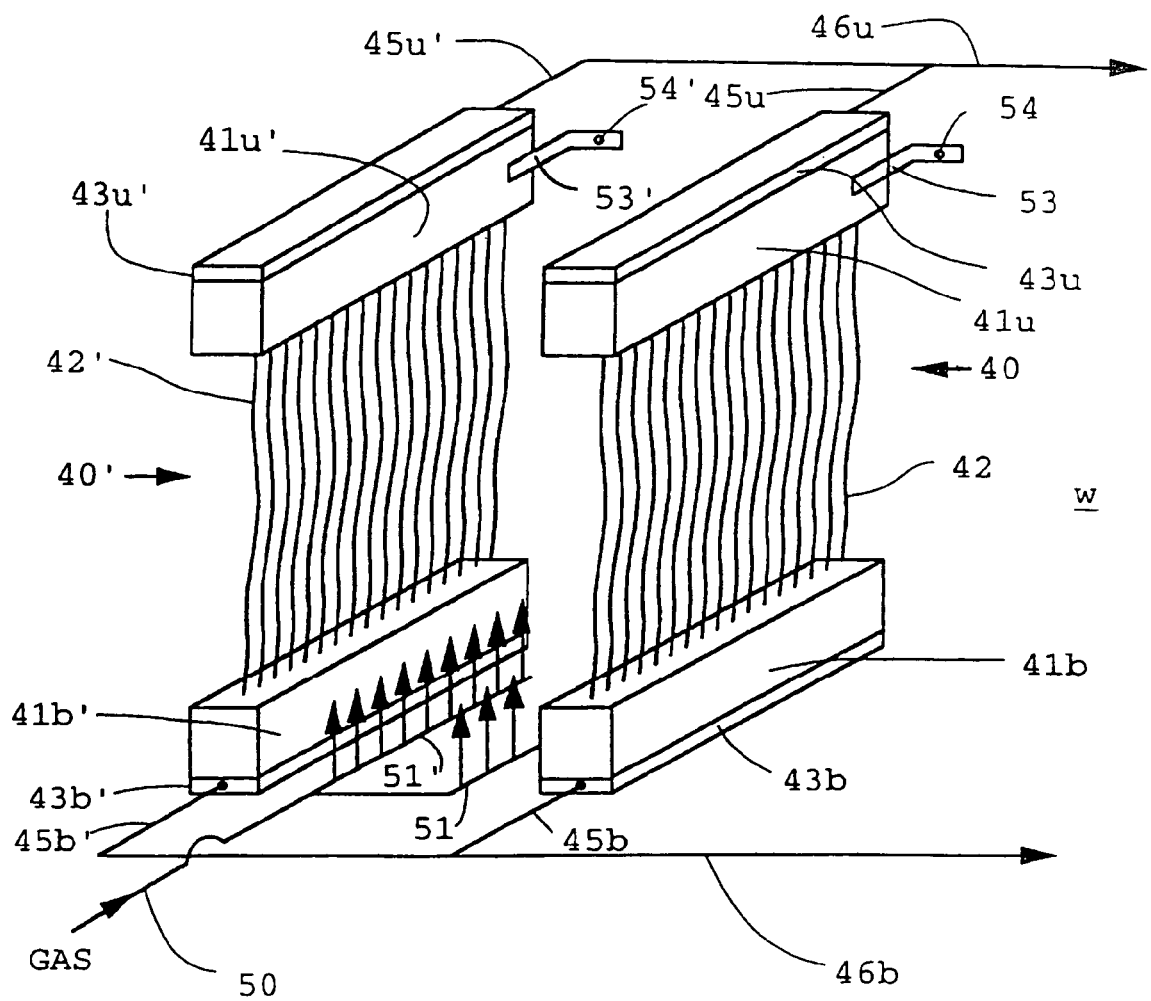
FIG. 10 is a perspective view schematically illustrating a pair of skeins in a bank in which the upper headers are mounted by their ends on the vertical wall of a tank. The skeins in combination with a gas-distribution means form a "gas-scrubbing assembly" deployed within a substrate, with the fibers suspended essentially vertically in the substrate. Positioning the gas-distribution means between the lower headers (and optionally, on the outside of skein fibers) generate masses (or "columns") of bubbles which rise vertically, codirectionally with the fibers, yet the bubbles scrub the outer surfaces of the fibers.

Referring to FIG. 10 there is illustrated a typical assembly referred to as a "wall-mounted bank" which includes at least two side-by-side skeins indicated generally by reference numerals 40 and 40' with their fibers 42 and 42'; fibers 42 are potted in upper and lower headers 41$u$ and 41$b$ respectively; and fibers 42' in headers 41$u$' and 41$b$'; headers 41$u$ and 41$b$ are fitted with permeate collecting means 46$u$ and 46$b$ respectively; headers 41$u$' and 41$b$' are fitted with permeate collecting means 46$u$' and 46$b$' respectively; and, the skeins share a common gas-distribution means 50. A "bank" of skeins is typically used to retrofit a large, deep tank from which permeate is to be withdrawn using a vacuum pump. In a large reservoir, several banks of skeins may be used in side-by-side relationship within a tank. Each skein includes multiple rows (only one row is shown) of fibers 42 and 42' in upper headers 41$u$ and 41$u$', and lower headers 41$b$ and 41$b$' respectively, and arms 51 and 51' of gas-distribution means 50 are disposed between the lower headers 41$b$ and 41$b$', near their bases. The upper headers 44$u$ and 44$u$' are mounted by one of their ends to a vertical interior surface of the wall W of a tank, with mounting brackets 53 and 53' and suitable fastening means such as bolts 54. The wall W thus functions as a spacer means which fixes the distance between the upper and lower headers. Each upper header is provided with a permeate collection pan 43$u$ and 43$u$', respectively, connected to permeate withdrawal conduits 45$u$ and 45$u$' and manifolded to permeate manifold 46$u$ through which permeate being filtered into the collection pans is continuously withdrawn. Each header is sealingly bonded around its periphery, to the periphery of each collection pan.

The skein fibers (only one array of which is shown for clarity) shown in this perspective view have an elongated rectangular parallelpiped shape the sides of which are irregularly shaped when immersed in a substrate, because of the random side-to-side displacement of fibers as they sway. An elongated rectangular parallelpiped shape is preferred since it permits a dense packing of fibers, yet results in excellent scrubbing of the surfaces of the fibers with bubbles. With this shape, a skein may be formed with from 10 to 50 arrays of fibers across the longitudinal width 'w' of the headers 41$u$, 41$b$, and 41$u$', 41$b$' with each array having fibers extending along the transverse length 'l' of each header. Air-tubes on either side of a skein effectively cleanse the fibers if there are less than about 30 arrays between the air-tubes. A skein having more than 30 arrays is preferably also centrally aerated as illustrated by the air-tube 52 in FIG. 9.

Thus, if there are about 100 fibers closely spaced-apart along the transverse length 'l' of an array, and there are 25 arrays in a skein in a header of longitudinal width 'w', then the opposed terminal end portions of 2500 fibers are potted in headers 41$u$ and 41$b$. The open ends of all fibers in headers 41$b$ and 41$b$' point downwards into collection zones in collection pans 43$b$ and 43$b$' respectively, and those of all fibers in headers 41$u$ and 41$u$' point upwards into collection zones in collection pans 43$u$ and 43$u$' respectively. Withdrawal conduits 45$u$ and 45$u$' are-manifolded to permeate manifold 46$u$ through which permeate collecting in the upper collection pans 43$u$ and 43$u$' is typically continuously withdrawn. If the permeate flow is high enough, it may also be withdrawn from the collection pans 43$b$ and 43$b$' through withdrawal conduits 45$b$ and 45$b$' which are manifolded to permeate manifold 46$b$. When permeate is withdrawn in the same plane as the permeate withdrawal conduits 45$u$, 45$u$' and manifold 46$u$, and the transmembrane pressure differential of the fibers is in the range from 35-75 kPa (5-10 psi), manifold 46$u$ may be connected to the suction side of a centrifugal pump which will provide adequate NPSH.

In general, the permeate is withdrawn from both the upper and lower headers, until the flux declines to so low a level as to require that the fibers be backwashed. The skeins may be backwashed by introducing a backwashing fluid through the upper permeate collection manifold 46$u$, and removing the fluid through the lower manifold 46$b$. Typically, from 3 to 30 skeins may be coupled together for internal fluid communication with one and another through the headers, permeate withdrawal means and the fibers; and, for external fluid communication with one another through an air manifold. Since the permeate withdrawal means is also used for backflushing it is generally referred to as a 'liquid circulation means', and as a permeate withdrawal means only when it is used to withdraw permeate.

When deployed in a substrate containing suspended and dissolved organic and inorganic matter, most fibers of organic polymers remain buoyant in a vertical position. The fibers in the skein are floatingly buoyed in the substrate with the ends of the fibers anchored in the headers. This is because (i) the permeate is essentially pure water which has a specific gravity less than that of the substrate, and most polymers from which the fibers are formed also have a specific gravity less than 1, and, (ii) the fibers are buoyed by bubbles which contact them. Fibers made from ceramic, or, glass fibers are heavier than water.

Adjacent the skeins, an air-distribution manifold 50 is disposed below the base of the bundle of fibers, preferably below the horizontal plane through the horizontal center-lines of the headers. The manifold 50 is preferably split into two foraminous arms 51 and 51' adjacent the bases of headers 41$b$ and 41$b$' respectively, so that when air is discharged through holes in each portion 51 and 51', columns of bubbles rise adjacent the ends of the fibers and thereafter flow along the fibers through the skeins. If desired, additional portions (not shown) may be used adjacent the bases of the lower headers but located on the outside of each, so as to provide additional columns of air along the outer surfaces of the fibers.

The type of gas (air) manifold is not narrowly critical provided it delivers bubbles in a preferred size range from about 1 mm to 25 mm, measured within a distance of from 1 cm to 50 cm from the through-passages generating them. If desired, each portion 51 and 51' may be embedded in the upper surface of each header, and the fibers potted around them, making sure the air-passages in the portions 51 and 51' are not plugged with potting compound. If desired, additional arms of air-tubes may be disposed on each side of each lower header, so that fibers from each header are scrubbed by columns of air rising from either transverse side.

The air may be provided continuously or intermittently, better results generally being obtained with continuous air flow. The amount of air provided depends upon the type of substrate, the requirements of the type of microorganisms, if any, and the susceptibility of the surfaces of the fibers to be plugged, there always being sufficient air to produce desired growth of the microorganisms when operated in a substrate where maintaining such growth is essential.

Figure 11:
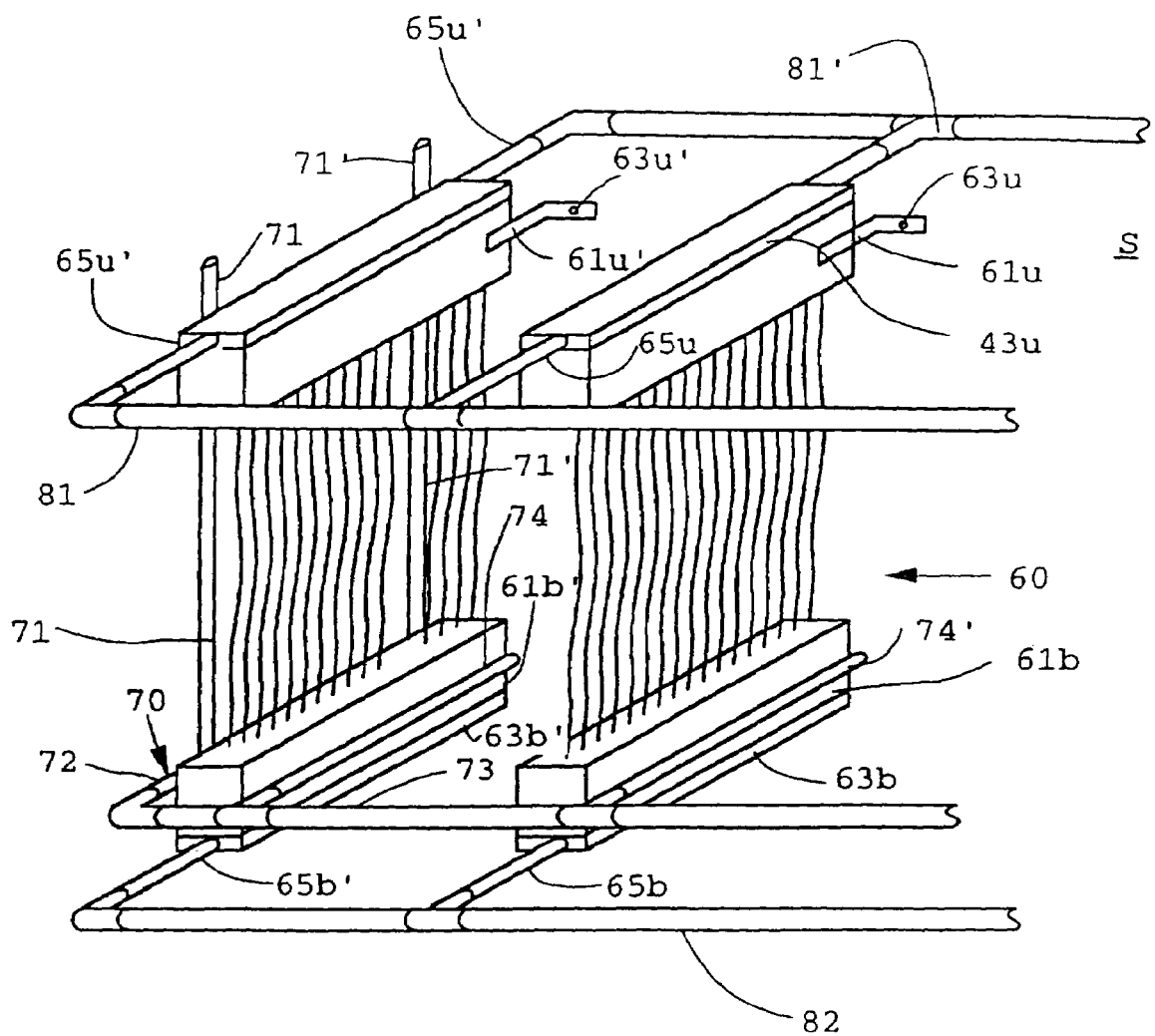
FIG. 11 is a perspective view of another embodiment of the scrubbing-assembly showing plural skeins (only a pair is shown) connected in a bank with gas-distribution means disposed between successive skeins, and, optionally, with additional gas-distribution means fore and aft the first and last skeins, respectively.

Referring to FIG. 11, there is schematically illustrated another embodiment of an assembly, referred to as a "stand-alone bank" of skeins, two of which are referenced by numeral 60. The bank is referred to as being a "stand-alone" because the spacer means between headers is supplied with the skeins, usually because mounting the skeins against the wall of a reservoir is less effective than placing the bank in spaced-apart relationship from a wall. In other respects, the bank 60 is analogous to the wall-mounted bank illustrated in FIG. 10.

Each bank 60 with fibers 62 (only a single row of the multiple, regularly spaced apart generally vertical arrays is shown for the sake of clarity) is deployed between upper and lower headers 61*u* and 61*b* in a substrate 'S'. The lower headers rest on the floor of the reservoir. The upper headers are secured to rigid vertical air tubes 71 and 71' through which air is introduced into a tubular air manifold identified generally by reference numeral 70. The manifold 70 includes (i) the vertical tubular arms 71 and 71'; (ii) a lower transverse arm 72 which is perforated along the length of the lower header 61*b*' and secured thereto; the arm 72 communicates with longitudinal tubular arm 73, and optionally another longitudinal arm 73' (not shown) in mirror-image relationship with arm 73 on the far side of the headers; and (ii) transverse arms 74 and 74' in open communication with 72 and 73; arms 74 and 74' are perforated along the visible transverse faces of the headers 61*b* an 61*b*', and 74 and 74' may communicate with tubular arm 73' if it is provided. The vertical air-tubes 71 and 71' conveniently provide the additional function of a spacer means between the first upper header and the first lower header, and because the remaining headers in the bank are also similarly (not shown) interconnected by rigid conduits, the headers are maintained in vertically and transversely spaced-apart relationship. Since all arms of the air manifold are in open communication with the air supply, it is evident that uniform distribution of air is facilitated.

As before, headers 61*u* and 61*u*' are each secured in fluid-tight relationship with collection zones in collection pans 63*u* and 63*u*' respectively, and each pan has withdrawal conduits 65*u* and 65*u*' which are manifolded to longitudinal liquid conduits 81 and 81'. Analogously, headers 61*b* and 61*b*' are each secured in fluid-tight relationship with collection zones in collection pans 63*b* and 63*b*' respectively, and each pan has withdrawal conduits 65*b* and 65*b*' which are manifolded to longitudinal conduits 82 and 82'. As illustrated, withdrawal conduits are shown for both the upper and the lower headers, and both fore and aft the headers. In many instances, permeate is withdrawn from only an upper manifold which is provided on only one side of the upper headers. A lower manifold is provided for backwashing. Backwashing fluid is typically flowed through the upper manifold, through the fibers and into the lower manifold. The additional manifolds on the aft ends of the upper and lower headers not only provides more uniform distribution of backwashing fluid but support for the interconnected headers. It will be evident that, absent the aft interconnecting upper conduit 81', an upper header such as 61*u* will require to be spaced from its lower header by some other interconnection to header 61*u*' or by a spacer strut between headers 61*u* and 61*b*.

In the best mode illustrated, each upper header is provided with rigid PVC tubular nipples adapted to be coupled with fittings such as ells and tees to the upper conduits 81 and 81' respectively. Analogously, each lower header is connected to lower conduits 82 and 82' (not shown) and/or spacer struts are provided to provide additional rigidity, depending upon the number of headers to be interconnected. Permeate is withdrawn through an upper conduit, and all piping connections, including the air connection, are made above the liquid level in the reservoir.

The length of fibers (between headers) in a skein is generally chosen to obtain efficient use of an economical amount of air, so as to maintain optimum flux over a long period of time. Other considerations include the depth of the tank in which the bank is to be deployed, the positioning of the liquid and air manifolds, and the convection patterns within the tank, inter alia.

Figure 13:
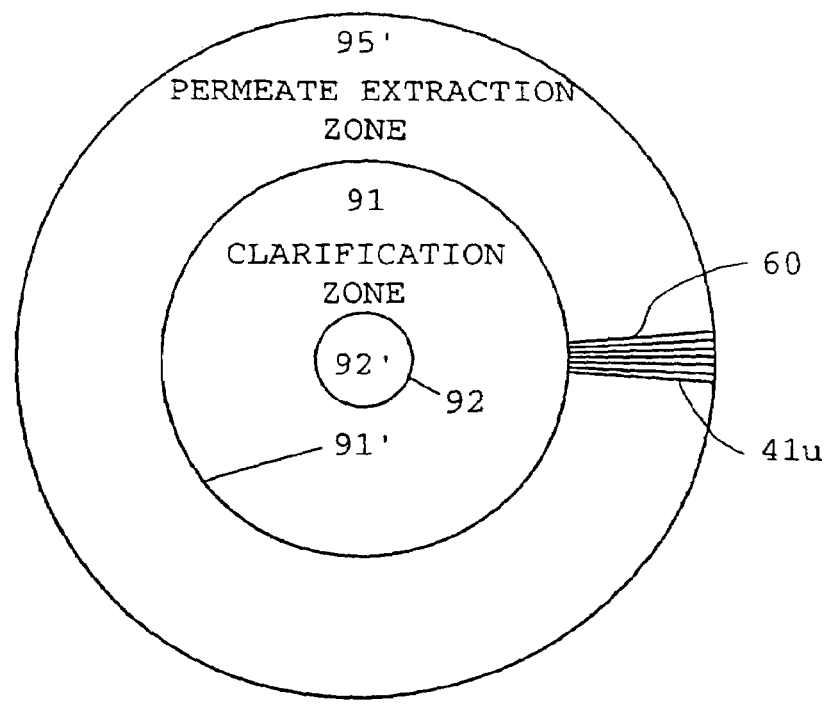
FIG. 13 is a plan view of the bioreactor shown in FIG. 12 showing how multiple banks of skeins may be positioned around the circumference of the bioreactor to form a large permeate extraction zone while a clarification zone is formed in the central portion with the help of baffles.
Figure 12:
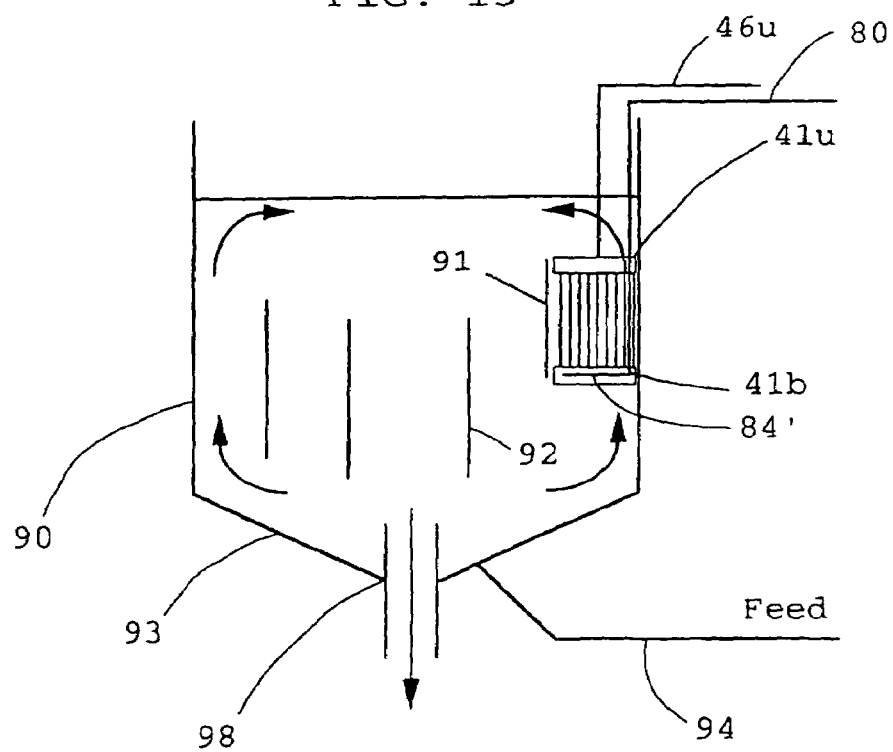
FIG. 12 is an elevational view schematically illustrating a bank of skeins mounted against the wall of a bioreactor, showing the convenience of having all piping connections outside the liquid.

In another embodiment of the invention, a bioreactor is retrofitted with plural banks of skeins schematically illustrated in the elevational view shown in FIG. 12, and the plan view shown in FIG. 13. The clarifier tank is a large circular tank 90 provided with a vertical, circular outer baffle 91, a vertical circular inner baffle 92, and a bottom 93 which slopes towards the center (apex) for drainage of accumulating sludge. Alternatively, the baffles may be individual, closely spaced rectangular plates arranged in outer and inner circles, but continuous cylindrical baffles (shown) are preferred. Irrespective of which baffles are used, the baffles are located so that their bottom peripheries are located at a chosen vertical distance above the bottom. Feed is introduced through feed line 94 in the bottom of the tank 90 until the level of the substrate rises above the outer baffle 91.

A bank 60 of plural skeins 10, analogous to those in the bank depicted in FIG. 10, each of which skeins is illustrated in FIG. 9, is deployed against the periphery of the inner wall of the bioreactor with suitable mounting means in an outer annular permeate extraction zone 95' (FIG. 13) formed between the circular outer baffle 91 and the wall of the tank 90, at a depth sufficient to submerge the fibers. A clarification zone 91' is defined between the outer circular baffle 91 and inner circular baffle 92. The inner circular baffle 92 provides a vertical axial passage 92' through which substrate is fed into the tank 90. The skeins form a dense curtain of fibers in radially extending, generally planar vertical arrays as illustrated in FIG. 9, potted between upper and lower headers 41*u* and 41*b*. Permeate is withdrawn through manifold 46*u* and air is introduced through air-manifold 80, extending along the inner wall of the tank, and branching out with air-distribution arms between adjacent headers, including outer distribution arms 84' on either side of each lower header 41*b* at each end of the bank. The air manifold 80 is positioned between skeins in the permeate extraction zone 95' in such a manner as to have bubbles contact essentially the entire surface of each fiber which is continuously awash with bubbles. Because the fibers are generally vertical, the air is in contact with the surfaces of the fibers longer than if they were arcuate, and the air is used most effectively to maintain a high flux for a longer period of time than would otherwise be maintained.

It will be evident that if the tank is at ground level, there will be insufficient liquid head to induce a desirable liquid head under gravity alone. Without an adequate siphoning effect, a centrifugal pump may be used to produce the necessary suction. Such a pump should be capable of running dry for a short period, and of maintaining a vacuum on the suction side of from cm (10")–51 cm (20") of Hg, or –35 kPa (–5 psi) to –70 kPa (–10 psi). Examples of such pumps rated at 18.9 L/min (5 gpm) @ 15" Hg, are (i) flexiblexmpeller centrifugal pumps, e.g. Jabsco #30510-2003; (ii) air operated diaphragm pumps, e.g. Wilden M2; (iii) progressing cavity pumps, e.g. Ramoy 3561; and (iv) hosepumps, e.g. Waukesha SP 25.

The skein may also be potted in a header which is not a rectangular prism, preferably in cylindrical upper and lower headers in which substantially concentric arrays of fibers are non-removably potted in cylindrical permeate pans, and the headers are spaced apart by a central gas tube which functions as both the spacer means and the gas-distribution means which is also potted in the headers. As before, the fibers are restrictedly swayable, but permeate is withdrawn from both upper and lower headers through a single permeate pan so that all connections for the skein, when it is vertically submerged, are from above. Permeate is preferably withdrawn from the lower permeate pan through a central permeate withdrawal tube which is centrally axially held within the central gas (air) tube. The concentric arrays are formed by wrapping successive sheets of flat arrays around the central air-tube, and gluing them together before they are potted. This configuration permits the use of more filtration surface area per unit volume of a reservoir, compared to skeins with rectangular prism headers, using the same diameter and length of fibers.

Figure 14:
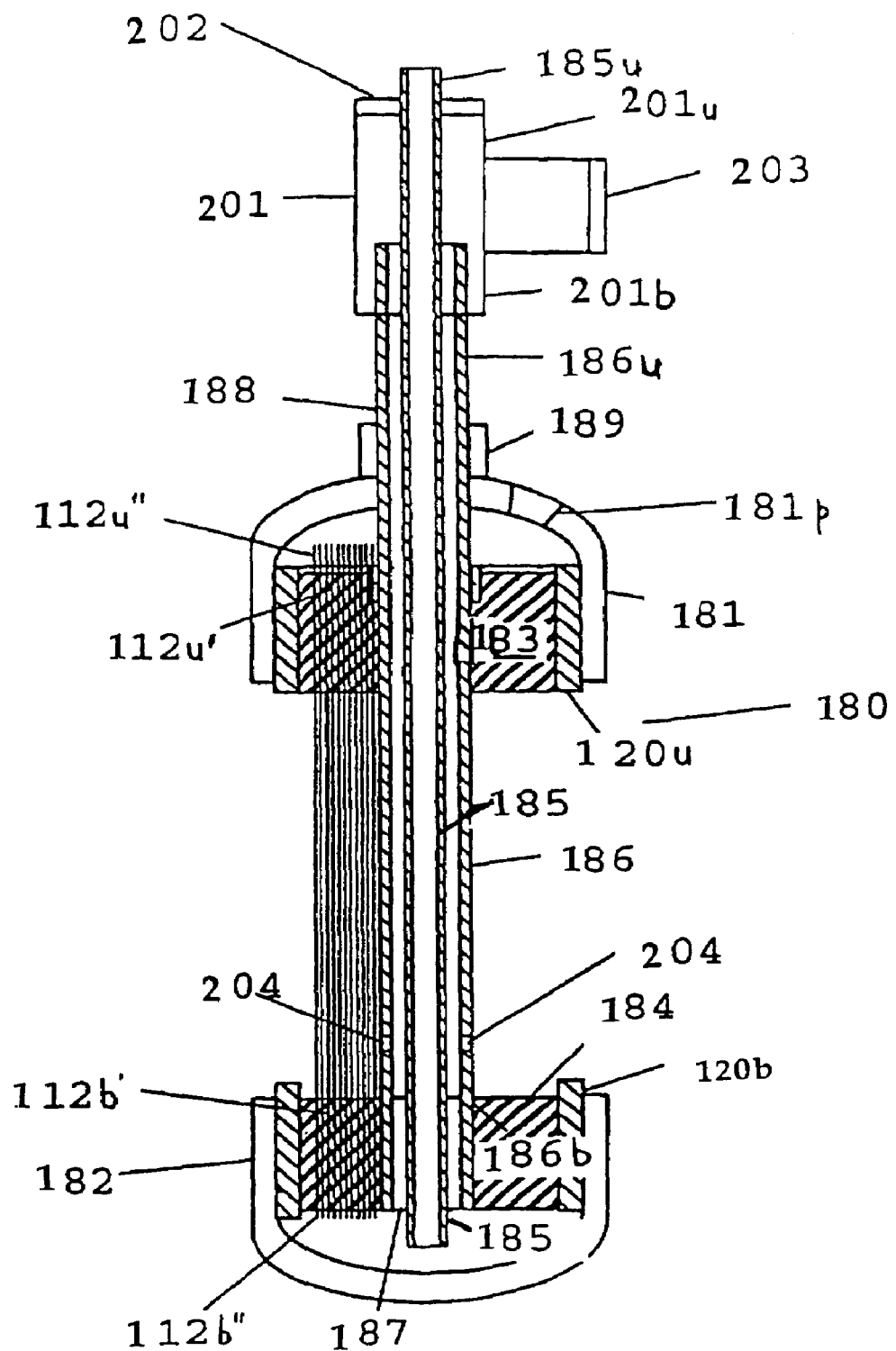
FIG. 14 illustratively shows another embodiment of the skein in which the permeate tube is concentrically disposed within the air supply tube and both are potted, near their lower ends in the lower header. Ports in the lower end of the air supply tube provide air near the base of the skein fibres.

Referring to FIG. 14 there is schematically illustrated another embodiment of skein 180 in which rigid permeate tube 185 is held concentrically within a rigid air-supply tube 186 which is potted axially within skein fibers 112 held between opposed upper and lower headers 183 and 184 in upper and lower rings 120$u$ and 120$b$ which are in turn sealed in end-caps 181 and 182 respectively. For ease of manufacture, the lower end 185$b$ of permeate tube 185 is snugly fitted and sealed in a bushing 187. The bushing 187 and end 185$b$ are then inserted in the lower end 86$b$ of the air supply tube 186 and sealed in it so that the annular zone between the outer surface of permeate tube 185 and the inner surface of air supply tube 186 will duct air to the base of the fibers but not permit permeate to enter the annular zone. The air supply tube is then placed on an array and the array is rolled into a spiral which is held at each end with rubber bands. The lower end of the roll is placed in a ring 120$b$ and a lower ring header is formed with a finished header 184 as described above. It is preferred to use a relatively stiff elastomer having a hardness in the range from 50 Shore A to about 20 Shore D, and mostpreferred to use a polyurethane having a hardness in the range from 50 Shore A to about 20 Shore D, measured as set forth in ASTM D-790, such as PTU-921 available from Canadian Poly-Tech Systems. To form the upper finished header 183 the air supply tube is snugly inserted through an 0-ring held in a central bore in a plate such as used in FIG. 5, to avoid loss of potting resin from the ring 120, and the fugitive resin and finishing resins poured and cured, first one then the other, in the ring. Lower finished header 184 is formed with intermediate portions 112$b'$ embedded, and terminal portions 112$b''$ protruding from the header's aft face. Upper finished header 183 is formed with intermediate portions 112$u'$ embedded, and terminal portion 112$u''$ protruding from the header's fore face. After the finished headers 183 and 184 are formed and the fibers checked for defects, the upper end 186$u$ of the air supply tube 186 is inserted through a central bore 188 in upper end-cap 181 and sealed within the bore with sealing compound or a collar 189. Preferably the permeate tube 185, the air supply tube 186 and the collar 189 are all made of PVC so that they are easily cemented together to make leak-proof connections.

As shown, permeate may be withdrawn through the permeate tube 185 from the permeate collection zone in the lower end-cap 182, and separately from the upper end-cap 181 through permeate withdrawal port 181$p$ which may be threaded for attaching a pipe fitting. Alliteratively, the permeate port 181$p$ may be plugged and permeate withdrawn from both end-caps through the permeate tube 185.

Upper end 185$u$ of permeate tube 185 and upper end 186$u$ of air supply tube 186 are inserted through a T-fitting 201 through which air is supplied to the air supply tube 186. The lower end of 201$b$ of one of the arms of the T 201 is slip-fitted and sealed around the air supply tube. The upper end 201$u$ of the other arm is inserted in a reducing bushing 202 and sealed around the permeate tube.

Air supplied to intake 203 of the T 201 travels down the annular zone between the permeate tube and the air supply tube and exits through opposed ports 204 in the lower portion of the air supply tube, just above the upper face 184$u$ of the lower header 184. It is preferred to thread ports 204 to threadedly secure the ends of arms 141 to form a sparger which distributed air substantially uniformly across and above the surface 184$u$. Additional ports may be provided along the length of the vertical air supply tube, if desired.

EXAMPLE

Microfiltration of an activated sludge at 30° C. having a concentration of 25 g/L (2.5% TSS) is carried out with a skein of polysulfone fibers in a pilot plant tank. The fibers are "air scrubbed" at a flow rate of 12 CFM (0.34 m$^3$/min) with a coarse bubble diffuser generating bubbles in the range from about 5 mm to 25 mm in nominal diameter. The air is sufficient not only for the oxidation requirements of the biomass but also for adequate scrubbing. The fibers have an outside diameter of 1.7 mm, a wall thickness of about 0.5 mm, and a surface porosity in the range from about 20% to 40% with pores about 0.2 μm in diameter, both latter physical properties being determined by a molecular weight cut off at 200,000 Daltons. The skein which has 1440 fibers with a surface area of 12 m$^2$ is wall-mounted in the tank, the vertical spaced apart distance of the headers being about 1% less than the length of a fiber in the skein The opposed ends of the fibers are potted in upper and lower headers respectively, each about 41 cm long and 10 cm wide. The fixing material of the headers is an epoxy having a hardness of about 70 Shore D with additional upper an lower laminae of softer polyurethane (about 60 Shore A and 30 Shore D respectively) above and below the epoxy lamina, and the fibers are potted to a depth sufficient to have their open ends protrude from the bottom of the header. The average transmembrane pressure differential is about 345 kPa (5 psi). Permeate is withdrawn through lines connected to the collection pan of each header with a pump generating about 34.5 kPa (5 psi) suction. Permeate is withdrawn at a specific flux of about 0.7 Im$^2$h/kPa yielding about 4.8 I/min of permeate which has an average turbidity of <0.8 NTU, which is a turbidity not discernible to the naked eye.

It will now be evident that the membrane device and basic separation processes of this invention may be used in the recovery and separation of a wide 2.5 variety of commercially significant materials, some of which, illustratively referred to, include the recovery of water from ground water containing micron and submicron particles of siliceous materials, preferably "gas scrubbing" with carbon dioxide; or, the recovery of solvent from paint-contaminated solvent. In each application, the choice of membrane will depend upon the physical characteristics of the materials and the separation desired. The choice of gas will depend on whether oxygen is needed in the substrate.

In each case, the simple process comprises, disposing a skein of a multiplicity of hollow fiber membranes, or fibers each having a length >0.5 meter, together having a surface area >1 m$^2$, in a body of substrate which is unconfined in a modular shell, so that the fibers are essentially restrictedly swayable in the substrate. The substrate is typically not under pressure greater than atmospheric The fibers have a low transmembrane pressure differential in the range from about 3.5 kPa (05 psi) to about 350 kPa (50 psi), and the headers, the terminal portions of the fibers, and the ends of the fibers are disposed in spaced-apart relationship as described hereinabove, so that by applying a suction on the aft face of at least one of the headers, preferably both, permeate is withdrawn through the collection means in which each header is mounted in fluid-tight communication Having thus provided a general discussion, and specific illustrations of the best mode of constructing and deploying a membrane device comprising a skein of long fibers in a substrate from which a particular component is to be produced as permeate, how the device is used in a gas-scrubbed skein, and having provided specific illustrative systems and processes in which the skein is used, it is to be understood that no undue restrictions are to be imposed by reason of the specific embodiments illustrated and discussed, and particularly that the invention is not restricted to a slavish adherence to the details set forth herein.

The invention claimed is:

1. A process for withdrawing filtered permeate from a substrate comprising the steps of:
   providing a reservoir containing non-pressurized substrate;
   providing an assembly in the non-pressurized substrate, the assembly having,
      an upper solid body and a lower solid body, an upper face of the lower solid body being separated from a lower face of the upper solid body by a vertical distance;
      a plurality of hollow fiber filtering membranes disposed generally vertically between the solid bodies, the ends of the membranes secured in the solid bodies, the membranes sealed in the solid bodies in a manner that prevents the non-pressurized substrate from contaminating the permeate, the membranes each having a length between the solid bodies at least 1.001 times the vertical distance but not longer than 1.05 times the vertical distance, the membranes secured in the solid bodies such that each of the membranes may move against one or more others of the membranes;
   an enclosure sealed to the one of the solid bodies in a manner that the enclosure and the one of the solid bodies define a cavity and prevent the non-pressurized substrate from entering the cavity, the enclosure being immersible in the non-pressurized substrate;
   a permeate port in communication with the cavity; and,
   the lumen of each membrane in fluid communication with the port via the cavity;
   applying a suction to lumens of the membranes via the permeate port to withdraw permeate from the non-pressurized substrate in the reservoir;
   directing a gas to flow into the non-pressurized substrate to provide bubbles in the non-pressurized substrate in the reservoir which bubbles contact the membranes as the bubbles rise through the non-pressurized substrate;
   adding substrate to the reservoir so that the membranes are immersed in non-pressurized substrate in the reservoir during the step of applying the suction; and,
   withdrawing non-pressurized substrate from the reservoir during the step of applying the suction.

2. The process of claim 1 wherein the step of directing the gas occurs during the step of applying the suction.

3. The process of claim 1 wherein the step of directing the gas is performed intermittently.

4. The process of claim 1 wherein the bubbles are provided during the step of directing the gas in an amount in a range from 0.001 scfm per membrane to about 0.03 scfm per membrane.

5. The process of claim 1 wherein the step of withdrawing non-pressurized substrate from the reservoir is performed during the steps of directing the gas and applying the suction.

6. The process of claim 1 wherein the membranes are not confined in a modular shell.

7. The process of claim 1 wherein the solid bodies are cylindrical.

8. The process of claim 1 wherein the substrate is an activated sludge containing growing microorganisms.

9. The process of claim 1 wherein the gas is air.

10. The process of claim 1 wherein each of the plurality of membranes comprises a braided support.

11. The process of claim 1 wherein the assembly further comprises,
   a second enclosure sealed to the other of the solid bodies in a manner that the second enclosure and the other of the solid bodies defines a second cavity; and,
   a second permeate port in communication with second cavity;
   and wherein,
   the step of applying a suction to the lumens of the membranes is performed via the permeate port and the second permeate port.

* * * * *